US008912248B2

(12) United States Patent
Shimohara

(10) Patent No.: US 8,912,248 B2
(45) Date of Patent: Dec. 16, 2014

(54) PIGMENT DISPERSION AND INK COMPOSITION, CURABLE COMPOSITION AND CURABLE INK COMPOSITION MAKING USE OF THE SAME

(75) Inventor: Norihide Shimohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 340 days.

(21) Appl. No.: 12/715,414

(22) Filed: Mar. 2, 2010

(65) Prior Publication Data

US 2010/0240830 A1 Sep. 23, 2010

(30) Foreign Application Priority Data

Mar. 23, 2009 (JP) ................................. 2009-070745

(51) Int. Cl.
| | | |
|---|---|---|
| C09D 11/00 | (2014.01) | |
| C09D 11/101 | (2014.01) | |
| C08G 18/28 | (2006.01) | |
| C08G 18/32 | (2006.01) | |
| C08G 18/38 | (2006.01) | |
| C08G 18/42 | (2006.01) | |
| C08G 18/62 | (2006.01) | |
| C08G 18/65 | (2006.01) | |
| C08G 18/66 | (2006.01) | |
| C08G 18/81 | (2006.01) | |
| C09D 11/326 | (2014.01) | |
| C09D 17/00 | (2006.01) | |

(52) U.S. Cl.
CPC .......... *C09D 11/101* (2013.01); *C08G 18/2865* (2013.01); *C08G 18/3215* (2013.01); *C08G 18/38* (2013.01); *C08G 18/4277* (2013.01); *C08G 18/622* (2013.01); *C08G 18/6511* (2013.01); *C08G 18/664* (2013.01); *C08G 18/8116* (2013.01); *C09D 11/326* (2013.01); *C09D 17/003* (2013.01)
USPC ............................. 523/160; 523/161; 524/589

(58) Field of Classification Search
USPC .................................... 523/160, 161; 524/589
See application file for complete search history.

(56) References Cited

U.S. PATENT DOCUMENTS

| | | | |
|---|---|---|---|
| 3,467,483 A * | 9/1969 | Kalopissis et al. ................. | 8/426 |
| 2003/0092833 A1 | 5/2003 | Frieling | |
| 2008/0227945 A1* | 9/2008 | Richards et al. ................. | 528/75 |
| 2008/0241485 A1* | 10/2008 | Shimohara et al. ......... | 428/195.1 |
| 2010/0240825 A1 | 9/2010 | Shimohara | |

FOREIGN PATENT DOCUMENTS

| | | |
|---|---|---|
| EP | 0763378 A | 3/1997 |
| EP | 1834997 A | 9/2007 |
| JP | 2993088 B2 | 12/1999 |
| JP | 2002-503746 T | 2/2002 |
| JP | 2002-526254 T | 8/2002 |
| JP | 2003-119414 A | 4/2003 |
| JP | 2003-321628 A | 11/2003 |
| JP | 2004-018656 A | 1/2004 |
| JP | 2004-131589 A | 4/2004 |
| JP | 2007-277506 A | 10/2007 |
| JP | 2010-222460 | 10/2010 |
| WO | 2007/006636 A2 | 1/2007 |
| WO | 2008/070601 A | 6/2008 |

OTHER PUBLICATIONS

Partial English language translation of the following: Office action dated Sep. 10, 2013 from the Japanese Patent Office in a Japanese patent application corresponding to the instant patent application. This office action translation is submitted now in order to supplement the understanding of patent document JP 2010-222460 which are cited in the office action and are being disclosed in the instant information Disclosure Statemenet.

\* cited by examiner

*Primary Examiner* — Gwendolyn Blackwell
*Assistant Examiner* — Ruiyun Zhang
(74) *Attorney, Agent, or Firm* — SOLARIS Intellectual Property Group, PLLC

(57) ABSTRACT

The present invention provides a pigment dispersion, containing (a) a pigment; and (b) a polymer having a polyurethane bond in a main chain, having at least one polymer chain selected from the group consisting of a polyester, a polyacrylate, a polymethacrylate and a polyalkylene oxide at a side chain of the polymer, and having a partial skeleton that is different from a partial skeleton included in a chemical structure of the pigment, as a pendant of the main chain.

11 Claims, No Drawings

PIGMENT DISPERSION AND INK COMPOSITION, CURABLE COMPOSITION AND CURABLE INK COMPOSITION MAKING USE OF THE SAME

CROSS-REFERENCE TO RELATED APPLICATION

This application claims priority under 35 USC 119 from Japanese Patent Application No. 2009-070745 filed on Mar. 23, 2009, the disclosure of which is incorporated by reference herein.

BACKGROUND

1. Field of the Invention

The present invention relates to a pigment dispersion and an ink composition, curable composition and a curable ink composition making use of the same. More particularly, the invention relates to a pigment dispersion having satisfactory pigment dispersibility and excellent storage stability under high temperature conditions, an ink composition, curable composition and a curable ink composition making use of the dispersion.

2. Related Art

Image recording methods of forming an image on a medium to be recorded such as paper or a plastic sheet, based on image data signals, involve electrophotographic systems, sublimation type or melt type heat transfer systems, inkjet systems and the like. Among them, inkjet systems can be operated with inexpensive recording apparatuses, and perform image formation directly on a medium to be recorded, by jetting an ink composition (hereinafter, also simply referred to as "ink") only on the image areas where needed. Thus, the inkjet systems can utilize ink with high efficiency at low running costs. Furthermore, the inkjet systems are excellent from the viewpoint of allowing droplet striking of very fine liquid droplets, and thereby enabling recording of highly colorful images.

According to the image recording methods involving inkjet systems, printing is possible not only on ordinary paper but also on non-absorptive media to be recorded, such as a plastic sheet and a metal plate. However, increasing the speed and image quality upon printing is becoming an important goal, and the inkjet systems are characterized in nature such that the time required for drying and curing of liquid droplets after printing greatly affects the sharpness of images.

One of the inkjet systems is a recording system making use of a curable ink composition that is curable upon irradiation with active energy rays. According to this method, ink liquid droplets can be cured by irradiating the droplets with active energy rays immediately after printing, and thereby images with sharp lines can be formed.

Such a curable ink composition is required to have high pigment dispersibility, for the formation of high precision images having excellent color-developing properties. Furthermore, it is important to control the viscosity or surface tension of the ink, in order to jet out fine ink droplets from the fine pores of an ink jetting head in the inkjet systems. In order to impart vivid brightness and high coloring power to an ink composition, micronization of pigment is essential. Particularly, in those inks used for inkjet recording, since the ink droplets that are jetted out exert great influence on the sharpness of images, the amount of liquid droplets being jetted is also reduced, and it is essential to use particles that are even finer than the thickness of the cured ink films formed as images. As such, if the pigment particles are micronized more and more so as to obtain high coloring power, dispersion of the microparticles becomes difficult, and aggregates are likely to be generated. There also occurs a problem that the addition of a dispersant that is used to enhance the dispersibility of pigment particles, causes an increase in the viscosity of the composition. The generation of pigment aggregates and an increase in the viscosity of ink composition both lower the ink jetting properties, and therefore, using an ink composition in which aggregation of pigment or viscosity increase has occurred, for inkjet recording, should be avoided.

In the case of using an ink composition for inkjet recording, the heat cycle properties must be excellent. The ink composition is held in a cartridge, and is heated during jetting, in order to lower the liquid viscosity. However, when jetting is ceased, since the temperature decreases during storage, the ink composition is subjected to repeated temperature changes involving heating and cooling. These temperature changes also exert adverse influence on the pigment dispersibility, so that there arises problems such as that the pigment dispersibility is lowered along with a lapse of time, and aggregation of pigment, viscosity increase or the like easily occurs.

In regard to a curable ink composition, the curability on objects to be printed and the film properties after curing also serve as important factors. In a curable ink composition, since the sharpness of images is secured by rapidly curing the composition by irradiation with active energy rays, a pigment dispersant that is prone to inhibit curing, a pigment dispersant containing a solvent that is a non-curable component, and a pigment dispersant that does not crosslink with the cured film and decreases the surface tackiness, lower the curability and become the causes of bleeding or a decrease in productivity, which is not preferable. When such compounds are incorporated, there occurs a problem that so-called blocking occurs, in which when printed matters are stored in a piled state, the printed surface of a printed matter and the surface of another printed matter that is superimposed with the printed surface (usually, the backside) stick together, or the contacting surfaces are mutually damaged by contamination.

Therefore, there is a demand for an ink composition which has sufficient fluidity during the storage before use, and maintains a micronized pigment in a stably dispersed state for a long time, and which has excellent curability such that the composition rapidly cures after being jetted to the surface of an object to be printed.

Various suggestions have been made on ink compositions containing a dispersant that efficiently disperses a pigment in the ink and has an effect of maintaining the dispersed state stably over a long time period.

For example, there have been proposed an ink composition containing, as a dispersant, a pigment derivative that enhances the affinity with pigments (see, for example, Japanese Patent Application Laid-Open (JP-A) Nos. 2003-119414 and 2004-18656); an ink composition containing a polymer having a basic group, as a dispersant to specific pigments such as phthalocyanines and quinacridones (see, for example, JP-A No. 2003-321628); an ink composition which contains a dispersant such as poly(ethyleneimine)-poly(12-hydroxystearic acid) graft polymer, and a specific monomer capable of dissolving the dispersant, but does not contain a volatile organic solvent (see, for example, JP-A No. 2004-131589); an ink composition containing, as a dispersant, a polyurethane having a neutralized salt such as carboxylate, phosphate, sulfonate or quaternary ammonium, in a pendant (see, for example, Japanese Patent Application National Publication (Laid-Open) No 2002-503746); a non-aqueous pigment-dispersed composition making use of a graft copolymer prepared using a nitrogen atom-containing, polymerizable vinyl macromonomer (see, for example, JP-A No. 2007-277506); and an ink composition containing, as a dispersant, a polyurethane that has a polymer containing an N-vinylamide, an N-vinyl lactam or a vinyl- or allyl-substituted nitrogen-containing heterocycle, and another polymer as graft chains (see, for example, Japanese Patent Application National Publication (Laid-Open) No. 2002-526254).

These ink compositions have pigments definitely finely dispersed therein so that the ink stability is higher than the conventional ink compositions. However, when these compositions were used as low viscosity ink compositions for the use in inkjet recording, the ink stability at high temperatures was not satisfactory; and when these compositions were applied to curable inks, the inks lacked curing sensitivity and still needed further improvement in blocking resistance.

Furthermore, it has been suggested that an ink composition containing an acrylic copolymer having a tertiary amino group and the organic chromophoric atomic group of a pigment, as a dispersant, results in an ink that is excellent in fluidity, clear imaging properties of the film, glossiness and coloring power (see, for example, Japanese Patent No. 2993088). However, the dispersant did not have a sufficient affinity with the components that are incorporated as ink media, such as polymerizable compounds, and still needed further improvement in stability.

SUMMARY

The present invention has been made in view of the above circumstances and provides a pigment dispersion including (a) a pigment; and (b) a polymer having a polyurethane bond in a main chain, having at least one polymer chain selected from the group consisting of a polyester, a polyacrylate, a polymethacrylate and a polyalkylene oxide at a side chain of the polymer, and having a partial skeleton that is different from a partial skeleton included in a chemical structure of the pigment, as a pendant of the main chain.

DETAILED DESCRIPTION OF THE INVENTION

According to an aspect of the present invention, there is provided a pigment dispersion that is excellent in the dispersibility of fine-grained pigment and the stability of the dispersed state even when the pigment concentration is high. According to another aspect of the invention, there is provided an ink composition that is capable of forming high quality images having vivid color tones and high coloring power, and is excellent in the dispersibility of fine-grained pigment contained therein and the stability of the dispersed state. According to another aspect of the invention, there is provided a curable composition that contains the pigment dispersion mentioned above, and is capable of curing rapidly under irradiation with active energy rays. According to still another aspect of the invention, an ink composition suitable for inkjet recording, which contains the pigment dispersion mentioned above, is capable of curing rapidly under irradiation with active energy rays.

The inventors of the present invention have devotedly and extensively conducted investigations, and as a result, they found that when a polymer having a specific structure which includes a skeleton structure that is in a specific relationship with a pigment, is incorporated as a pigment dispersant, there may be obtained a pigment dispersion having excellent pigment dispersibility, which has decreases in the dispersion stability effectively suppressed even after the dispersion undergoes long-term storage or repeated temperature changes, and also has excellent curability under irradiation with active energy rays; an ink composition making use of the dispersion; and a curable composition. Thus, the present invention was completed.

[Pigment Dispersion]

The pigment dispersion according to the invention is a composition having a pigment uniformly dispersed in a medium, and liquids and solids may all be used as the medium.

The pigment dispersion of the invention is a pigment dispersion containing (a) a pigment, and (b) a polymer having a polyurethane bond in a main chain, having at least one polymer chain selected from the group consisting of a polyester, a polyacrylate, a polymethacrylate and a polyalkylene oxide at a side chain of the polymer, and having a partial skeleton that is different from a partial skeleton included in the chemical structure of the pigment, as a pendant of the main chain. Here, the "partial skeleton" that is included as a pendant in the polymer of component (b), is required to have a chemical structure which is different from the partial skeleton included in the chemical structure of the pigment of component (a), and more preferably, this partial skeleton is a partial skeleton composed of a fused ring structure having two or more rings fused together. The polymer of component (b) has at least polymer chain selected from a polyester, a polyacrylate, a polymethacrylate and a polyalkylene oxide, at a side chain of the polymer.

The pigment dispersion of the invention is such that under the action of the polymer of component (b) possessing a function of dispersing the pigment of component (a) uniformly and effectively in a medium, the pigment of component (a) is maintained in a state of being stably dispersed over a long time period. A primary feature of such a polymer of component (b) is that the polymer has, in its molecule, a partial skeleton having a chemical structure that is different from the partial skeleton included in the chemical structure of the pigment of component (a). It is thought that the partial skeleton included in the component (b) interacts with the pigment of component (a) via the planarity of the partial skeleton's steric structure or via the functional group contained in the partial skeleton, and satisfactorily adsorbs to the pigment of component (a), so that, as a result, the dispersibility of the pigment is enhanced, and an operating effect of maintaining the dispersed state stably over a long time period.

It is also thought that since the partial skeleton included in the polymer of component (b) is a partial skeleton that is different from the chemical structure of the pigment of component (a), the intensity of the interaction between the pigment and the polymer and between the polymer molecules themselves falls in an appropriate range, and thus aggregation or increases in the viscosity particularly at high concentrations are suppressed. Furthermore, it is thought that since the adsorption properties between the component (a) and the polymer of component (b) is excellent, adsorption and desorption particularly when the components are stored at high temperatures is small, and the dispersed state is maintained even at high temperatures. It is also thought that since the side chain selected from the polyester, polyacrylate, polymethacrylate and polyalkylene oxide that are introduced to the polymer of component (b) has an action of enhancing the affinity with a medium, the polymer molecules of component (b) are present in an extended state particularly in a liquid medium, and exhibit an excellent steric repulsion effect, thus suppressing the aggregation of the pigment. Due to these actions, the pigment dispersion of the invention is believed to exhibit excellent dispersion stability even under high temperatures at which the pigment easily adsorbs and desorbs from the dispersant.

[Ink Composition]

The pigment dispersion of the invention may be used as an ink composition after being mixed with a liquid medium (examples of this liquid medium include an organic solvent, water and mixtures thereof) having an affinity with the pigment dispersant, and additives in accordance with the application as desired. Since the pigment dispersion of the invention has a fine-grained pigment uniformly dispersed, the color-developing properties are excellent, and the pigment dispersion exhibits excellent fluidity because low viscosity dispersion may be obtained. Furthermore, since the pigment dispersion of the invention is also excellent in dispersion stability, with which the dispersed state is maintained over a long time period, less sedimentation and aggregation occurs, and the long-term storage stability is also satisfactory. Due to these characteristic performances, the pigment dispersion is suitably used in ink compositions in the applications of drawing images or characters, such as ink compositions for inkjetting, ink composition for writing inks, and ink compositions for textile printing. When the pigment dispersion of the invention is used, an ink composition having a low viscosity and excellent viscosity stability may be prepared, and therefore, the pigment dispersion is particularly useful as an ink composition for inkjet recording which requires stringent viscosity management.

[Curable Composition]

When the pigment dispersion of the invention is used, the pigment may be dispersed finely and stably even in the case of using a so-called polymerizable compound having a polymerizable functional group such as an ethylenic double bond or a cyclic ether, as a medium, and thus the pigment dispersion may also be suitably used as a curable composition. The curable composition is a composition that cures when energy such as heat or light is applied. It is preferable that the curable composition contains a polymerization initiator that generates a radical, a cation or the like upon irradiation with energy such as heat or light. For example, when the composition contains a thermopolymerization initiator, the composition efficiently cures when heated (including the instance of heating by infrared irradiation), and when the composition contains a photopolymerization initiator, the composition efficiently cures by irradiating the photopolymerization initiator with active light rays.

Here, the active energy rays are not particularly limited as long as they are energy rays capable of applying energy that can generate an initiator species in the curable composition through irradiation therewith, and broadly include high energy radiation such as α-rays, γ-ray and X-ray; light rays over a spectrum from ultraviolet radiation to infrared radiation, such as ultraviolet radiation, visible radiation and infrared radiation; and particle beams such as electron beams. Among them, from the viewpoints of curing sensitivity and easy availability of apparatuses, ultraviolet radiation and electron beams are preferred, and ultraviolet radiation is more preferred. Therefore, as for the curable composition of the invention, a composition that may be cured when irradiated with ultraviolet radiation is preferable. The light sources of ultraviolet radiation that may be used include a mercury lamp, a metal halide lamp, a light emitting diode (LED), a semiconductor laser, a fluorescent lamp, and the like. According to the invention, it is preferable to use a mercury lamp, a metal halide lamp or a light emitting diode as a light source, and it is more preferable to use a light source having an emission wavelength of 300 nm to 400 nm.

As can be seen from the features mentioned above, when the pigment dispersion of the invention is used as a curable ink, and particularly as a curable ink composition that is used in an image recording method involving an inkjet system, the characteristics would be most effectively exhibited, which is preferable.

Hereinafter, various constituent components used in the pigment dispersion of the invention and a composition making use of the dispersion will be explained in sequence.

[Pigment of Component (a)]

According to the invention, the pigment of component (a) functions as a coloring material of the pigment dispersion, ink composition or curable composition. According to the invention, a pigment having a fine particle size is uniformly and stably dispersed in the ink composition due to the function of the pigment dispersant, and as a result, the pigment dispersion of the invention has excellent color-developing properties, while sharp images with excellent weather resistance may be formed.

The pigment is not particularly limited and may be appropriately selected according to the purpose, but from the viewpoint of the similarity between the pigment and the pigment dispersant in terms of chemical structure, known organic pigments may be preferably used. Examples of the pigment include those described in Seishiro Ito, ed., "Dictionary of Pigments" (published in 2000), W. Herbst and K. Hunger, "Industrial Organic Pigments," JP-A Nos. 2002-12607, 2002-188025, 2003-26978 and 2003-342503, and the like.

Examples of the organic pigments include yellow pigments, magenta pigments, cyan pigments, green pigments, orange pigments, brown pigments, violet pigments, black pigments, and the like.

The yellow pigments are pigments exhibiting yellow color, and examples thereof include a monoazo pigment, a disazo pigment, a bibenzidine-based azo pigment, an azo lake pigment, a condensed azo pigment, an acidic dye lake pigment, a basic dye lake pigment, an anthraquinone pigment, a quinophthalone pigment, a pyrazolone pigment, an acetolone pigment, a metal complex salt pigment, a nitroso pigment, a metal complex azomethine pigment, a benzimidazolone pigment, and the like. Among these, examples of the pigment that may be preferably used in the invention include C.I. Pigment Yellow (hereinafter, abbreviated to PY) 1, PY3, PY12, PY13, PY14, PY16, PY17, PY18, PY24, PY60, PY74, PY83, PY93, PY94, PY95, PY97, PY100, PY109, PY110, PY115, PY117, PY120, PY128, PY138, PY139, PY150, PY151, PY153, PY154, PY155, PY166, PY167, PY173, PY175, PY180, PY181, PY185, PY194, PY213, PY214, PY219, and the like.

The magenta pigments are pigments exhibiting red or magenta color, and examples thereof include a monoazo-based pigment, a β-naphthol pigment, a disazo pigment, an azo lake pigment, a condensed azo pigment, an acidic dye lake pigment, a basic dye lake pigment, an anthraquinone-based pigment, a thio indigo pigment, a perinone pigment, a perylene pigment, a quinacridone pigment, an isoindolinone pigment, an alizarin lake pigment, a naphtholone pigment, a napthol AS-based lake pigment, a naphthol AS pigment, a diketopyrrolopyrrole pigment, and the like.

Among these, examples of the pigment that may be preferably used in the invention include C.I. Pigment Red (hereinafter, abbreviated to PR) 1, PR2, PR3, PR4, PR5, PR6, PR21, PR38, PR42, PR53:1, PR57:1, PR52:1, PR46, PR48, PR81, PR83, PR88, PR144, PR149, PR166, PR179, PR178, PR190, PR224, PR123, PR224, PR19, PR122, PR202, PR207, PR209, PR180, PR83, PR170, PR171, PR172, PR174, PR175, PR176, PR177, PR179, PR185, PR194, PR208, PR214, PR220, PR221, PR242, PR247, PR254, PR255, PR256, PR262, PR268, PR264, PR269, PR272, PR19, and the like.

The cyan pigments are pigments exhibiting blue or cyan color, and examples thereof include a disazo-based pigment, a phthalocyanine pigment, an acidic dye lake pigment, a basic dye lake pigment, an anthraquinone-based pigment, an alkali blue pigment, and the like. Examples of the pigment that may be preferably used in the invention include C.I. Pigment Blue (hereinafter, abbreviated to PB) 1, PB15, PB15:1, PB15:2, PB15:3, PB15:4, PB15:6, PB16, PB18, PB24, PB25, PB60, PB79, and the like.

The green pigments are pigments exhibiting green color, and examples thereof include a phthalocyanine pigment, a metal complex pigment, and the like. Examples of the pigment that may be preferably used in the invention include C.I. Pigment Green (hereinafter, abbreviated to PG) 7, PG8, PG10, PG 36, and the like.

The orange pigments are pigments exhibiting orange color, and examples thereof include an isoindoline-based pigment, an anthraquinone-based pigment, a B-naphthol pigment, a naphthol AS pigment, an isoindolinone pigment, a perinone pigment, a disazo pigment, a quinacridone pigment, an acetolone pigment, a pyrazolone pigment, and the like. Examples of the pigment that may be preferably used in the invention include C.I. Pigment Orange (hereinafter, abbreviated to PO) 2, PO3, PO4, PO5, PO13, PO15, PO16, PO22, PO24, PO34, PO36, PO38, PO43, PO48, PO49, PO51, PO55, PO60, PO61, PO62, PO64, PO66, PO72, PO74, and the like.

The brown pigments are pigments exhibiting brown color, and examples thereof include naptholone pigments such as C.I. Pigment Brown (hereinafter, abbreviated to PBr)25 and PBr32, and the like.

The violet pigments are pigments exhibiting violet color, and examples thereof include a naptholone pigment, a perylene pigment, a naphthol AS pigment, a dioxazine pigment, and the like. Examples of the pigment that may be preferably used in the invention include C.I. Pigment Violet (hereinafter, abbreviated to PV)13, PV17, PV23, PV29, PV32, PV37, PV50, and the like.

The black pigments are pigments exhibiting black color, and examples thereof include an indazine pigment, a perylene pigment, and the like. Examples that may be used in the invention include C.I. Pigment Brack (hereinafter, abbreviated to PBk)1, PBk31, PBk32, and the like.

Among these pigments, acetolone pigments such as PY120, PY151, PY154, PY180, PY181, PY194, PO36 and PO62; naphthol AS pigments such as PR170 and PR187; quinacridone pigments such as PV19, PR42, PR122, PR202, PR209 and PR46; anthraquinone pigments such as PR251, PR177, PB60 and PY108; dioxazine pigments such as PV23; and the like are more preferably used.

The average particle size of the pigment used in the invention is such that a smaller particle size presents more excellent color-developing properties, and therefore, the average particle size is preferably in the range of 0.01 to 0.4 µm, and more preferably from 0.02 to 0.3 µm. The selection of the (a) pigment, (b) polymer and dispersion medium, the dispersion conditions, and the conditions for post-treatment processes are set up so that the maximum particle size would be 3 µm or less, and preferably 2 µm or less. When the pigment dispersion of the invention is used as an ink composition for inkjet recording, the clogging of the ink head nozzles is suppressed by this particle size management, and the storage stability of ink, ink transparency and curing sensitivity may be maintained. Since a (b) polymer having excellent dispersibility and stability is used in the invention, even when a microparticulate pigment is used, a uniform and stable dispersion may be obtained.

The particle size of the pigment in a pigment dispersion or an ink composition may be measured by a known measurement method. Specifically, the measurement may be made by a centrifugal sedimentation light transmission method, an X-ray transmission method, a laser diffraction/scattering method, or a dynamic light scattering method.

The pigment is added to the pigment dispersion in an amount of preferably from 1 to 40% by weight, and more preferably from 1.5 to 30% by weight, in terms of solids content. When the pigment dispersion of the invention is used as an ink composition, the pigment is added to the ink composition in an amount of preferably from 1 to 20% by weight, and more preferably from 1.5 to 15% by weight, in terms of solids content.

[Polymer of Component (b)]

The polymer of component (b) that is included in the pigment dispersion of the invention is a polymer having a polyurethane bond in a main chain, having at least one polymer chain selected from the group consisting of a polyester, a polyacrylate, a polymethacrylate and a polyalkylene oxide in a side chain, and having a partial skeleton that is different from a partial skeleton included in the chemical structure of the pigment used as the component (a) (hereinafter, the former partial skeleton may also be referred to as a "different partial skeleton"), as a pendant of the main chain.

The different partial skeleton in the polymer of component (b) of the invention is introduced to a pendant of the main chain. A pendant is in the form in which the different partial skeleton is introduced to an atom (for example, a carbon atom or the like) constituting a molecular chain that forms the main chain and contains a polyurethane bond, via a linking group. It is preferable that the different partial skeleton described above be introduced to the polymer via a linking group having 1 to 20 carbon atoms, which may be substituted. A linking group in this range has excellent molecular mobility, and thus may work advantageously on the adsorption to the pigment.

A preferable linking group may be a single bond, or a divalent linking group having 1 to 20 carbon atoms selected from the group consisting of an alkylene group, an alkenylene group and an arylene group, which may be substituted with a substituent selected from an alkyl group, a tertiary amino group, an ester group, an amide group, a heterocyclic group and an alkoxy group; an amide bond, an ester bond, a urea bond, a urethane bond, a carbonate bond, an ether group, a thioether group, and a carbonyl group, or a divalent linking group having 1 to 20 carbon atoms formed by combining two or more linking groups selected from the group listed above.

It is important that the polymer of component (b) of the invention includes, within the molecule, a partial skeleton that is different from the partial skeleton included in the molecule of the pigment used as the component (a). As for such a different partial skeleton, a partial skeleton having a molar extinction coefficient of 100,000 or less at the maximum wavelength in the wavelength range of 400 nm to 800 nm, results in a pigment dispersion having a color that is a result of directly bringing the best of the color possessed by the pigment of component (a), and thus it is preferable. Such a partial skeleton is preferably a carbocyclic or heterocyclic fused ring structure composed of two or more rings, more preferably two or three rings.

Preferable examples of the fused ring structure as such a different partial skeleton include the benzimidazolone structure contained in acetolone-based pigments or naphtholone-based pigments, the acridone structure contained in quinacridone-based pigments, the phthalimide structure contained in perylene-based pigments, the anthraquinone structure contained in anthraquinone-based pigments, the naphthalene structure contained in naphthol AS pigments, the carbazole structure contained in Dioxazine Violet, and the like.

Since the polymer of component (b) used in the invention has a partial skeleton that is different from the partial skeleton included in the molecule of the pigment used as the component (a) as described above, the polymer may exhibit an interaction similar to the interaction occurring between the molecules of the pigment. Thus, the pigment of component (a) and the polymer of component (b) interact, and this interaction brings an effect of enhancing the dispersibility of the pigment of component (a) and maintaining the dispersed state over a long time period.

According to the invention, the different partial skeleton is a structure having a hydrogen bondable functional group that is excellent in the planarity in terms of steric structure, and it is thought that when an appropriate combination is selected, the different skeleton offers an effect of exhibiting an interaction appropriate for the dispersion of the pigment of component (a). When the polymer of component (b) according to the invention is used, there may be obtained a dispersion having excellent fluidity even if it is a pigment dispersion having a high pigment concentration Examples of combinations of the different partial skeleton included in the component (b) with respect to the specific examples of the pigment of component (a) that are preferably used in the invention, will be listed below. However, the invention is not intended to be limited to these specific examples.

With respect to quinacridone pigments: naphthalimide structure, benzimidazolone structure, imidazolidinone structure, anthraquinone structure, carbazole structure.

With respect to azo pigments such as imidazolone azo pigments and disazo pigments: acridone structure, naphthalimide structure, anthraquinone structure.

With respect to diketopyrrolopyrrole pigments: naphthalimide structure, acridone structure.

With respect to dioxazine violet pigments: naphthalimide structure.

With respect to phthalocyanine pigments: acridone structure, naphthalimide structure.

With respect to carbon black pigments: acridone structure, and the like.

Since the polymer of component (b) used in the invention has a different partial skeleton introduced into the polymer, it is preferable to use a compound having one or two hydroxyl groups or isocyanate groups together with the different partial skeleton as described above (hereinafter, referred to as "compound (i)"). Specific examples of this compound (i) include the following. However, the invention is not intended to be limited to these specific examples.

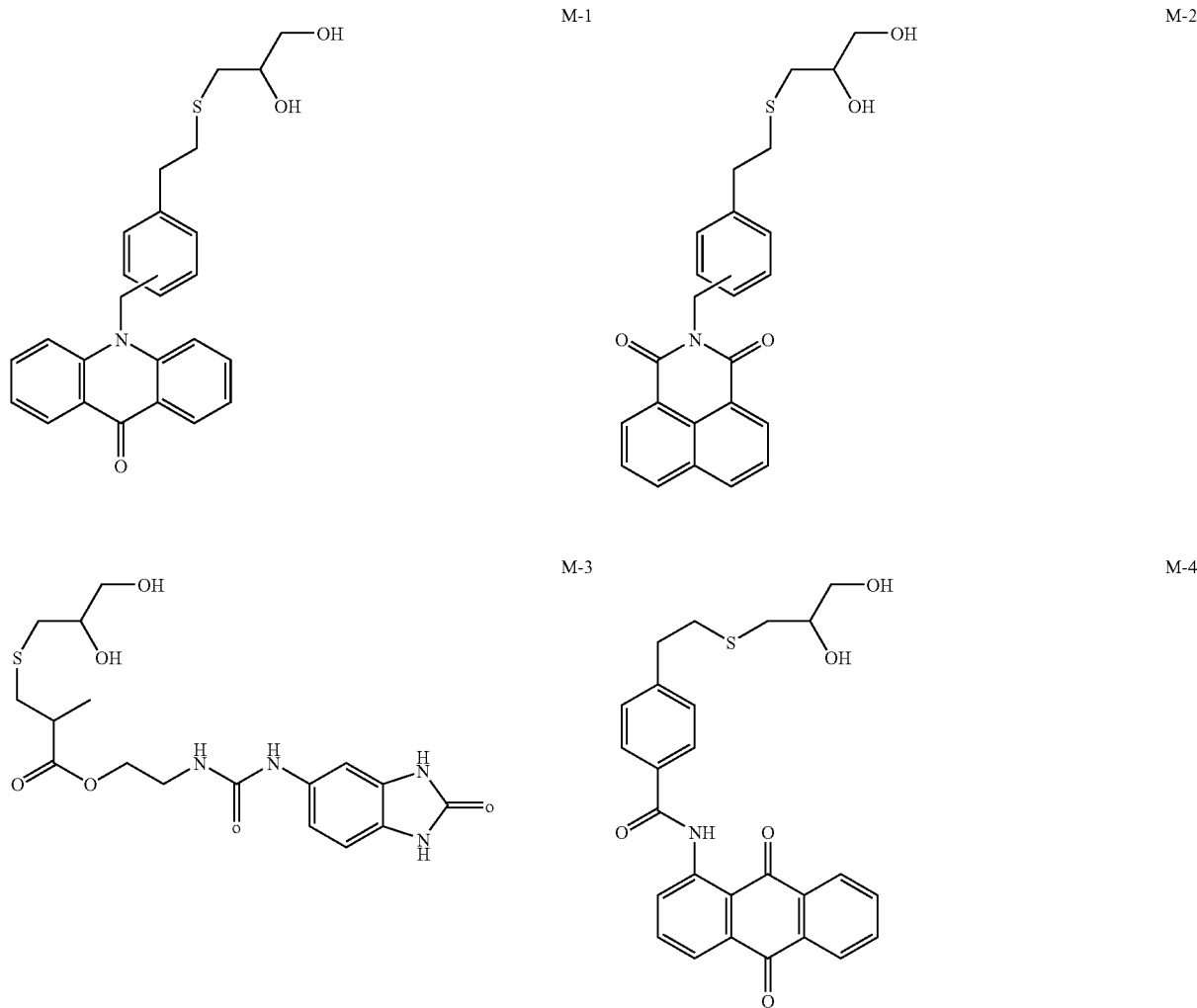

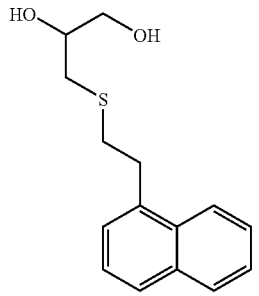

M-5

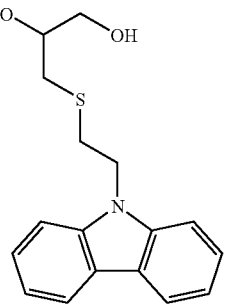

M-6

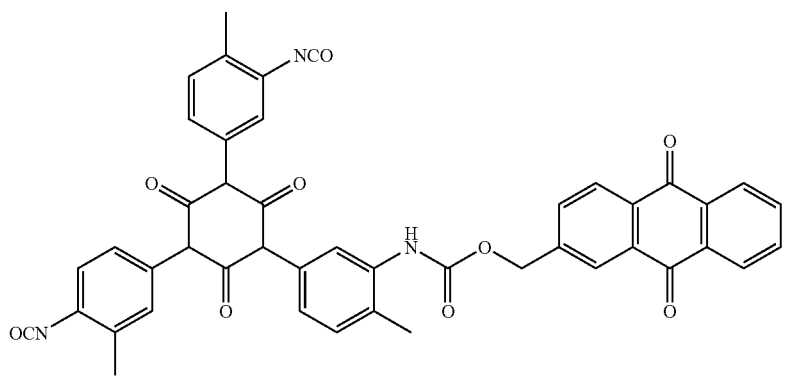

M-7

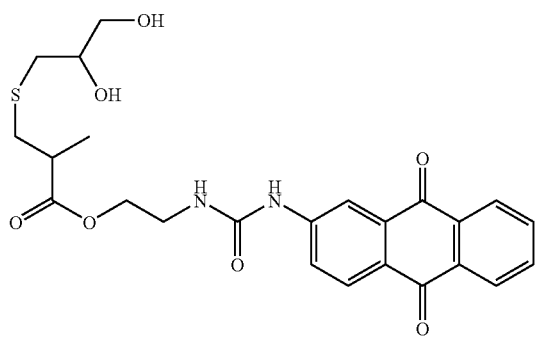

M-8

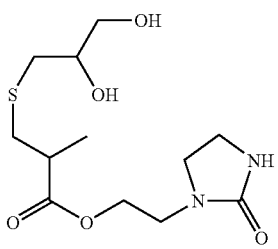

M-9

(In regard to the number n in the carbocyclic or heterocyclic fused ring structure, composed of n rings, of the partial skeleton different from the partial skeleton included in the chemical structure of the pigment, M-1: n=3, M-2: n=3, M-3: n-2, M-4: n=3, M-5: n=2, M-6: n=3, M-7: n=3, M-8: n=3, M-9: n=1)

The polymer of component (b) used in the invention has a polymer chain selected from a polyester, a polyacrylate, a polymethacrylate and a polyalkylene oxide. This polymer chain is preferably included in a group branched out from the molecular chain containing a polyurethane bond (hereinafter, also referred to as "side chain"). The polymer containing such a branched group and the polymer chain may be synthesized by a reaction between the compound (i) mentioned above, at least one compound selected from a polyester, a polyacrylate, a polymethacrylate and a polyalkylene oxide, all of which having one or two hydroxyl groups (hereinafter, referred to as "compound (ii)"), and a compound having at least two isocyanate groups, which is different from the compound (i) (hereinafter, referred to as "compound (iii)").

The polymer chain selected from a polyester, a polyacrylate, a polymethacrylate and a polyalkylene oxide, is a component for giving an affinity with the medium used when the polymer is used in a pigment dispersion, an ink composition or a curable composition. Any polymer chain having a good affinity with the medium is acceptable, but preferably appropriate ones are selected in accordance with the medium used. It is preferable that the compound (ii) carry the one or two hydroxyl groups as terminal groups, and thereby the reaction with the isocyanate compound is facilitated.

It is preferable that the polymer of component (b) used in the invention contain a polymer chain selected from a polyester, a polyacrylate, a polymethacrylate and a polyalkylene oxide in a branched chain. The method for introducing the polymer chain may be appropriately selected from a method of mixing the compounds (i), (ii) and (iii), with a compound which is used as necessary, having a basic group or an acidic group and one or two hydroxyl groups or primary amino groups and a chain extending agent, such that the hydroxyl group, primary amino group and isocyanate group are present in equivalent amounts, and allowing the mixture to react; a method of reacting the compound (i) with the compound (iii) in advance such that the equivalent of the isocyanate group of the compound (iii) would in excess of the equivalent of the hydroxyl group of the compound (i) to thereby synthesize a polyurethane polymer having an isocyanate group, and reacting the isocyanate group of the polymer with the hydroxyl group of the compound (ii); and the like.

The polyester used in the invention is preferably an aliphatic polyester, from the viewpoint of the affinity with the medium. An aliphatic polyester may be synthesized by a ring-opening polymerization of lactones, and for example, an aliphatic polyester having different affinities with the medium may be synthesized by copolymerizing different monomers such as ε-caprolactone, γ-butyrolactone and valerolactone. The polyalkylene oxide is obtained by a ring-opening polymerization of a cyclic ether such as ethylene oxide, propylene oxide, an oxetane compound and tetrahydrofuran, and when two or more different cyclic ethers are copolymerized, the resultant polymer may be adjusted to have an adequate affinity with the medium. The polyester or polyalkylene oxide thus obtained may be converted to a compound having one or two hydroxyl groups at the chain ends, by reacting the terminal group with glycidol or the like.

The polyacrylate and polymethacrylate having one or two hydroxyl groups at the chain ends (hereinafter, the polyacrylate and the polymethacrylate will be collectively referred to as "poly(meth)acrylate") may be easily synthesized by reacting the poly(meth)acrylate) with a mercapto compound having a hydroxyl group. The compound examples of the chain transfer agent that are suitably used in the invention will be presented below, but any compound may be used without particular limitation as long as the desired polymer of the invention can be obtained. For example, examples of a chain transfer agent that is capable of introducing one hydroxyl group to the chain end include 2-mercapto-1-ethanol, 3-mercapto-1-propanol, 3-mercapto-3-methylbutan-1-ol, 6-mercapto-1-hexanol, 11-mercapto-1-undecanol, and the like.

The chain transfer agent that is capable of introducing two hydroxyl groups to the chain end may be 1-thioglycerol or the like.

A preferable example of the ester substituent of the poly (meth)acrylate (for example, in the case of polyalkyl acrylate, the ester substituent is the corresponding alkyl group) may be an alkyl group having 1 to 20 carbon atoms or an aryl group having 6 to 20 carbon atoms, both of which may be substituted with any substituent. The substituent for the alky group may be an acyl group, an aryl group having 6 to 10 carbon atoms, an alkoxy group having 1 to 8 carbon atoms, a glycidyl group, an alkenyl group having 2 to 10 carbon atoms, or the like.

Among these ester substituents, an aryl group, an alkyl group substituted with an alkoxy group, and an unsubstituted alkyl group are preferably used.

Specific preferable compound examples of the polyester, polyacrylate, polymethacrylate and polyalkylene oxide, respectively having one or two hydroxyl groups introduced as terminal groups, will be presented below.

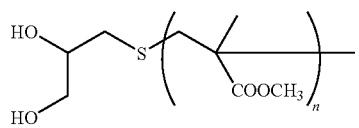

B-1

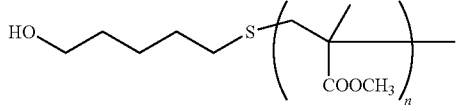

B-2

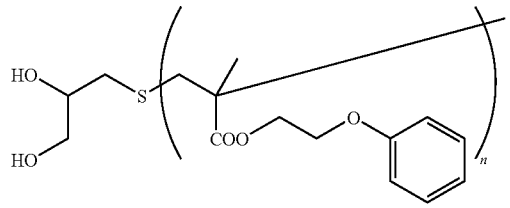

B-3

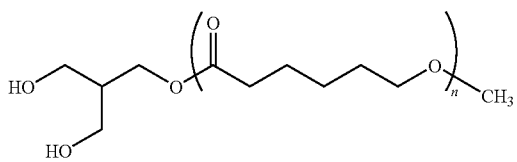

B-4

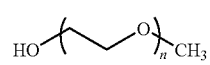

B-5

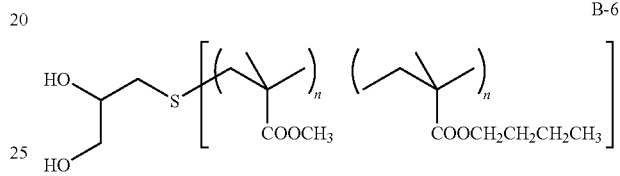

B-6

The number average molecular weight of the polyester, polyacrylate, polymethacrylate and polyalkylene oxide is preferably from 350 to 15,000, more preferably from 500 to 12,000, and most preferably from 1,000 to 10,000.

In order to synthesize the polymer of component (b) of the invention, it is preferable to use (iii) an isocyanate compound which has two or more isocyanate groups and is different from the compound (i), in combination. The number of the isocyanate groups in the isocyanate compound of compound (iii) is from 2 to 6, and more preferably from 2 or 3. Examples of the compound having 2 to 6 isocyanate groups include the organic polyisocyanates listed below.

In regard to the organic polyisocyanates, any of those conventionally known compounds may be used, but examples include aromatic diisocyanates such as, for example, 4,4'-diphenylmethane diisocyanate (MDI), 2,4- or 2,6-tolylene diisocyanate (TDI), m- or p-phenylene diisocyanate, 1,3- or 1,4-xylene diisocyanate (XDI), 1,5-naphthalene diisocyanate (NDI), and 3,3'-dimethyl-4,4'-biphenylene diisocyanate (TODI); and aliphatic diisocyanates such as, for example, hexamethylene diisocyanate (HDI), hydrogenated MDI (H12MDI) and isophorone diisocyanate (IPDI). Prepolymer type, nurate type, urea type and carbodiimide type variants of these diisocyanates are also preferably used. These diisocyanates and variants may also be used as mixtures of two or more compounds.

In the synthesis of the polymer of component (b) used in the invention, a compound having a basic group or an acidic group and one or two hydroxyl groups or primary amino groups may be used according to necessity. When a basic functional group or an acidic functional group is introduced into the polymer chain, an acid-base interaction occurs between the pigment and the polymer, and thereby adsorption of the polymer of component (b) to the component (a) is accelerated, which is preferable. It is effective to incorporate such a compound having a basic group or an acidic group and one or two hydroxyl groups or primary amino groups in an amount in the range of 1.5% by weight to 10% by weight, based on the polymer of component (b). In this invention, use may be made of a compound having a known basic functional group or acidic functional group and one or two hydroxyl groups or primary amino groups.

Examples of the compound having a basic functional group or an acidic functional group and one or two hydroxyl groups or primary amino groups, include N,N-dimethylethanolamine, N,N-diethylethanolamine, 3-dimethylamino-1-propanol, 1,3-bis(dimethylamino)-2-propanol, pyrrolidino-1,2-propanediol, 1-(2-aminoethyl)pyrrolidine, histamine, 1-(3-aminopropyl)imidazole, 2,6-pyridinedimethanol, 4-pyridinepropanol, lactic acid, 10-hydroxydecanoic acid, 4-(hydroxymethyl)benzoic acid, and the like.

Upon the synthesis of the polymer of component (b) used in the invention, a chain extending agent may be used in combination as necessary, in order to regulate the reactivity or the properties of the polymer. Any conventionally known chain extending agent may be used, but one may be made of a low molecular weight polyol such as, for example, ethylene glycol, propylene glycol, diethylene glycol, 1,4-butanediol, 1,6-hexanediol, trimethylolpropane, neopentyl glycol, hydroquinone, bis(hydroxyethyl)benzene, 2,2'- or 4,4'-dihydroxydiphenylmethane or 2,2-bis(4-hydroxyphenyl)propane; or a low molecular weight diamine such as, for example, ethylenediamine, propylenediamine, m- or p-phenylenediamine, 1,3- or 1,4-xylylenediamine, or isophorone diamine.

The proportions of the previously mentioned compounds (i), (ii) and (iii) that may be used in the synthesis of the polymer of component (b) of the invention, are preferably in the range of 2% to 40% for the compound (i), 50% to 95% for the compound (ii), and 3% to 50% for the compound (iii), and more preferably in the range of 3% to 30% for the compound (i), 50% to 80% for the compound (ii) and 4% to 40% for the compound (iii), in terms of percentage by weight based on the polymer of component (b).

The organic solvent that may be used in the synthesis of the polymer of component (b) is not particularly limited as long as the solvent dissolves the raw materials and the produced polymer and does not react with the isocyanate compound, and any known organic solvent may be used. Specifically, ketones, esters, amides, sulfoxides, ethers and the like are preferably used. At the time of the synthesis, a catalyst such as an alkylamine, dibutyltin dilaurate or bismuth triol may also be added.

The weight average molecular weight of the polymer of component (b) used in the invention is preferably in the range of 5,000 to 200,000, more preferably in the range of 10,000 to 200,000, and most preferably in the range of 15,000 to 180,000.

Several specific examples of the polymer of component (b) used in the invention will be presented in the following Table 1, in terms of the respective compound names and their use amounts of the compounds (i), (ii) and (iii), the acid-base interaction compound and the chain extending agent used in the synthesis. However, the invention is not intended to be limited to these.

Here, in the Table 1, TDI represents tolylene diisocyanate; MYTEC GP770A (trade name, manufactured by Mitsubishi Chemical Corp.; tolylene diisocyanate trimer) represents a trifunctional isocyanate; DEG represents diethylene glycol; PDM represents 2,6-pyridine dimethanol; and HMBA represents 4-(hydroxymethyl)benzoic acid. The molecular weight of the polymer compounds is weight average molecular weight.

TABLE 1

| Polymer of component (b) | | Compound used in synthesis<br>Upper row: Name<br>Middle row: Molecular weight of compound<br>Lower row: Composition ratio (% by weight) | | | | |
|---|---|---|---|---|---|---|
| Name | Weight average molecular weight | (i) | (ii) | (iii) | Compound for Acid-base interaction | Chain extending agent |
| P-1 | 120,000 | M-1<br>419.5<br>9 | B-1<br>6000<br>64.3 | TDI<br>168<br>18 | PDM<br>139.2<br>3.1 | DEG<br>106<br>5.7 |
| P-2 | 38,000 | M-2<br>421.5<br>10.9 | B-4<br>900<br>46.7 | TDI<br>168<br>29.1 | PDM<br>139.2<br>13.2 | |
| P-3 | 45,000 | M-1<br>419.5<br>7.7 | B-5<br>1200<br>44.2 | MYTEC GP770A<br>522.5<br>38.5 | PDM<br>139.2<br>7.2 | DEG<br>106<br>2.3 |
| P-4 | 110,000 | M-2<br>421.5<br>6.8 | B-1<br>6000<br>73 | TDI<br>168<br>13.6 | PDM<br>139.2<br>4.0 | DEG<br>106<br>2.6 |
| P-5 | 60,000 | M-6<br>301.4<br>7.1 | B-6<br>1300<br>24.5 | MYTEC GP770A<br>522.5<br>49.3 | HMBA<br>152.2<br>11.5 | DEG<br>106<br>7.5 |
| P-6 | 70,000 | M-7<br>757.7<br>10.2 | B-1<br>6000<br>80.8 | TDI<br>168<br>4.2 | PDM<br>139.2<br>3.1 | DEG<br>106<br>1.7 |
| P-7 | 51,000 | M-8<br>486.5<br>4.6 | B-1<br>6000<br>84.4 | TDI<br>168<br>7.9 | PDM<br>139.2<br>2.6 | DEG<br>106<br>0.5 |
| P-8 | 30,000 | M-9<br>306.4<br>9.8 | B-1<br>6000<br>63.8 | TDI<br>168<br>17.9 | PDM<br>139.2<br>7.4 | DEG<br>106<br>1.1 |

The pigment dispersion of the invention may be added with one species of the polymer of component (b), or may be added with a combination of two or more kinds The content of the specific polymer in the pigment dispersion is preferably from 1 to 100% by weight, and more preferably from 5 to 50% by weight, based on the pigment.

In the ink composition of the invention, the pigment dispersant of the invention may be added, and a known pigment dispersant may be used in combination, so long as the effects are not impaired. The amount of addition of the known pigment dispersant is preferably 50% by weight or less, based on the pigment dispersant of the invention.

[Preparation of Pigment Dispersion]

In the process of dispersing a pigment, a known dispersing apparatus such as, for example, a ball mill, a sand mill, an attriter, a roll mill, a jet mill, a homogenizer, a paint shaker, a kneader, an agitator, a Henschel mixer, a colloid mill, an ultrasonic homogenizer, a pearl mill or a wet jet mill, may be used.

It is preferable to add the specific polymer (b) at the time of performing the dispersing of a pigment. Upon the addition of the pigment, synergist compounds may also be used in accordance with various pigments, as auxiliary dispersants. An auxiliary dispersant is preferably added in an amount of 1 to 10 parts by weight relative to 100 parts by weight of the pigment.

As the dispersion medium for various components such as the pigment in the pigment dispersion, ink composition and curable composition of the invention, a solvent may be added, or a polymerizable compound, which is a low molecular weight component, may also be used as the dispersion medium, in a solventless state. The curable composition or curable ink composition as a preferable aspect of the invention, is an active energy ray-curable ink, and since the ink is applied onto a medium to be recorded and then cured, it is preferable that the ink be solventless. This is because, when the solvent remains behind in the cured ink image, there arise problems such as deterioration of solvent resistance, lowering of blocking properties, defective curing, and the problem of VOC (Volatile Organic Compound) concerning the remaining solvent. From this point of view, it is preferable to use a polymerizable compound as the dispersion medium, and to select a polymerizable compound having the lowest viscosity among others, from the viewpoints of enhancement of the dispersion suitability or the handlability of the ink composition, and of inkjetting suitability. Because the polymer of component (b) of the invention may also be produced within the polymerizable composition as described above, the polymer may be used without adding purification processes after the production. On the other hand, in regard to a vinyl polymer for example, the production of which within a polymerizable compound is difficult, it is necessary to perform the polymerization in a solventless system or to add a solvent removal process, and this is disadvantageous in view of production suitability.

(Polymerizable Compound)

It is preferable that the curable composition of the invention contain a polymerizable compound. This polymerizable compound is not particularly limited as long as it is a compound capable of undergoing a polymerization reaction and curing when certain energy is applied, and any kind of monomer, oligomer and polymer may be used without limitation. Particularly, various known polymerizable monomers known as photoradical polymerizable compounds and photocationic polymerizable compounds, which undergo a polymerization reaction under the action of an initiating species generated from a polymerization initiator that is added as desired, are preferable.

The polymerizable compound may be used singly or as mixtures of plural species, for the purpose of adjusting the rate of reaction, ink properties, cured film properties and the like. Furthermore, the polymerizable compound may be a monofunctional compound or a polyfunctional compound.

According to the invention, various known radical polymerizable compounds that undergo a polymerization reaction under the action of an initiating species generated from a photoradical initiator, may be used as the polymerizable compound.

Examples of the known radical polymerizable monomers that may be used in the invention include the (meth)acrylate compounds, (meth)acrylamide compounds, vinyl ether compounds, styrene compounds, N-vinyl compounds and the like described in JP-A No. 2008-208190 or JP-A No. 2008-266561.

Among these, it is preferable to use one or plural species of monomer selected from a (meth)acrylate compound, a (meth)acrylamide compound, a vinyl ether compound and an N-vinyl compound, as the radical polymerizable compound according to the invention. It is also preferable to use a polyfunctional polymerizable monomer having a number of polymerizable functional groups, and a monofunctional polymerizable monomer in combination, from the viewpoint of the rate of curing, viscosity of the ink composition, and the film properties of printed samples.

Examples of the cationic polymerizable monomer that is used as the polymerizable compound according to the invention include the epoxy compounds, vinyl ether compounds, oxetane compounds and the like described in JP-A Nos. 6-9714, 2001-220526, 2001-40068, 2001-55507, 2001-310937, 2001-310938, 2001-310937, 2001-220526, 2001-31892, 2003-341217, 2008-266561 and the like.

In the ink composition of the invention, the polymerizable compound may be used singly, or may be used in combination of two or more compounds, but from the viewpoint of regulating the curing sensitivity of the ink or the properties of the cured film, it is preferable to use two or more polymerizable compounds in combination.

The content of the polymerizable compound in the ink constitution in the case of using a polymerizable compound in the ink composition, is suitably in the range of 50 to 95% by weight, preferably 60 to 92% by weight, and more preferably 70 to 90% by weight, based on the whole composition. If the polymerizable compound is used in a smaller amount than this range, the curability tends to decrease.

It is preferable to use a polymerization initiator in combination in the curable composition of the invention, from the viewpoint of enhancing the curing sensitivity.

<Polymerization Initiator>

The curable composition of the invention preferably contains a polymerization initiator for radical polymerization or cationic polymerization, and more preferably a photopolymerization initiator.

The photopolymerization initiator according to the invention is a compound that undergoes chemical changes under the action of active energy rays or through an interaction with the electronically excited state of a sensitizing dye, and produces at least any one of a radical, an acid and a base.

The photopolymerization initiator may be appropriately selected for use, from those having a sensitivity to the active energy rays that are irradiated such as, for example, an ultraviolet radiation having a wavelength of 400 to 200 nm, far-ultraviolet radiation, g-rays, h-rays, i-rays, KrF excimer laser light, ArF excimer laser light, electron beams, X-rays, molecular beams or ion beams.

In regard to the photopolymerization initiator, agents that are known to those ordinarily skilled in the art may be used without limitation, and a large number of examples described in, for example, Bruce M. Monroe, et al., Chemical Revue, 93, 435 (1993); R. S. Davidson, Journal of Photochemistry and Biology A: Chemistry, 73, 81 (1993); J. P. Faussier, "Photoinitiated Polymerization-Theory and Applications": Rapra Review, Vol. 9, Report, Rapra Technology (1998); and M. Tsunooka, et al., Prog. Polymer. Sci., 21, 1 (1996), may be used. The compounds that are utilized in the chemically amplified type photoresist or photocationic polymerization described in "Organic Material for Imaging," edited by the Organic Electronics Material Research Institute, Bunshin Publishing Co., Ltd. (1993), pp. 187-192, may also be used.

There is also known a family of compounds that cause bond cleavage in an oxidative or reductive manner through an interaction with the electronically excited state of a sensitizing dye, such as those described in F. D. Saeva, Topics in Current Chemistry, 156, 59 (1990); G. G. Masla, Topics in Current Chemistry, 168, 1 (1993); H. B. Shuster, et al., JACS, 112, 6329 (1990); I. D. F. Eaton, et al., JACS, 102, 3298 (1980); and the like.

As for the photopolymerization initiator, for example, the photopolymerization initiators described in JP-A No. 2008-208190 or JP-A No. 2008-266561 may be used, and aromatic ketones, aromatic onium salt compounds, organic peroxides, hexaarylbiimidazole compounds, ketoxime ester compounds, borate compounds, azinium compounds, metallocene compounds, active ester compounds, compounds having carbon-halogen bonds, and the like are preferable, while aromatic ketones, ketoxime salt compounds and aromatic onium salt compounds are particularly preferable.

The photopolymerization initiator as the polymerization initiator may be used singly or in combination of two or more compounds.

The content of the photopolymerization initiator in the curable composition is preferably in the range of 0.1 to 20% by weight, more preferably 0.5 to 15% by weight, and particularly preferably 1 to 10% by weight, in the curable composition.

(Other Components)

(Sensitizing Dye)

The curable composition of the invention may be added with a sensitizing dye for the purpose of enhancing the sensitivity of the photopolymerization initiator. As the sensitizing dye, a compound which belongs to the following compound classes and has an absorption wavelength in the region from 350 nm to 450 nm, is preferable.

Examples of the sensitizing dye include polynuclear aromatics (for example, pyrene, perylene, triphenylene, anthracene), xanthenes (for example, fluorescein, eosin, erythrosine, rhodamine B, Rose Bengal), cyanines (for example, thiacarbocyanine, oxacarbocyanine), merocyanines (for example, merocyanine, carbomerocyanine), thiazines (for example, thionine, methylene blue, toluidine blue), acridines (for example, acridine orange, chloroflavin, acriflavin), anthraquinones (for example, anthraquinones), squaryliums (for example, squarylium), and coumarins (for example, 7-diethylamino-4-methylcoumarin).

As the sensitizing dye, the compounds represented by the following formulas (IX) to (XIII) are more preferable.

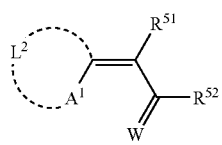

(IX)

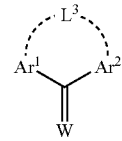

(X)

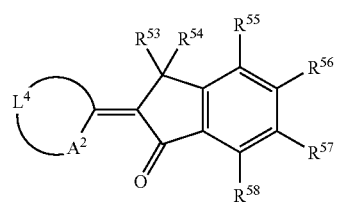

(XI)

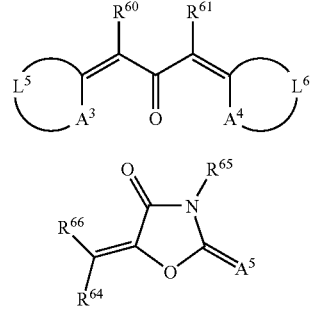

(XII)

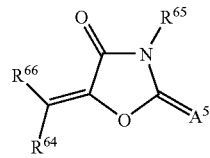

(XIII)

In the formula (IX), $A^1$ represents a sulfur atom or $-NR^{50}-$; $R^{50}$ represents an alkyl group or an aryl group; $L^2$ represents a non-metal atomic group which, jointly with the adjacent $A^2$ and adjacent carbon atoms, forms the basic nucleus of the dye; $R^{51}$ and $R^{52}$ each independently represent a hydrogen atom or a monovalent non-metal atomic group, while $R^{51}$ and $R^{52}$ may be bonded to each other to form the acidic nucleus of the dye; and W represents an oxygen atom or a sulfur atom.

In the formula (X), $Ar^1$ and $Ar^2$ each independently represent an aryl group, and are linked via a bond based on $-L^3-$; $L^3$ represents $-O-$ or $-S-$; and W has the same meaning as defined for the formula (IX).

In the formula (XI), $A^2$ represents a sulfur atom or $NR^{59}$; $L^4$ represents a non-metal atomic group which, jointly with the adjacent $A^2$ and adjacent carbon atoms, forms the basic nucleus of the dye; $R^{53}$, $R^{54}$, $R^{55}$, $R^{56}$, $R^{57}$ and $R^{58}$ each independently represent a monovalent non-metal atomic group; and $R^{59}$ represents an alkyl group or an aryl group.

In the formula (XII), $A^3$ and $A^4$ each independently represent $-S-$, $-NR^{62}-$ or $-NR^{63}-$; $R^{62}$ and $R^{63}$ each independently represent a substituted or unsubstituted alkyl group, or a substituted or unsubstituted aryl group; $L^5$ and $L^6$ each independently represent a non-metal atomic group which, jointly with the adjacent $A^3$ and $A^4$ and adjacent carbon atoms, form the basic nucleus of the dye; and $R^{60}$ and $R^{61}$ each independently represent a hydrogen atom or a monovalent non-metal atomic group, or may be bonded to each other to form an aliphatic or aromatic ring.

In the formula (XIII), $R^{66}$ represents an aromatic ring or heterocycle which may be substituted; $A^5$ represents an oxygen atom, a sulfur atom or $-NR^{67}-$; $R^{64}$, $R^{65}$ and $R^{67}$ each independently represent a hydrogen atom or a monovalent non-metal atomic group; and $R^{67}$ with $R^{64}$, and $R^{65}$ with $R^{67}$ may be respectively bonded to each other to form an aliphatic or aromatic ring.

Specific preferable examples of the compounds represented by the formulas (IX) to (XIII) include the example compounds (A-1) to (A-24) shown below, and the like.
(A-1)
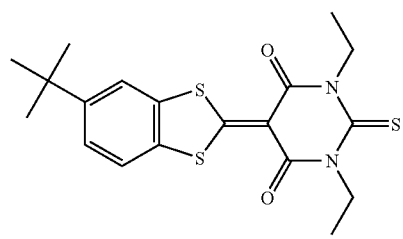
(A-2)
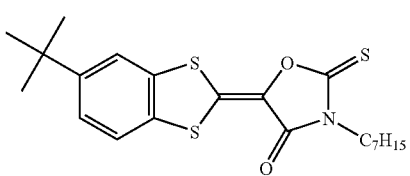
(A-3)
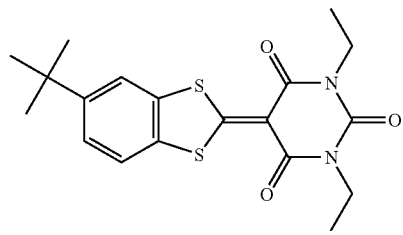
(A-4)
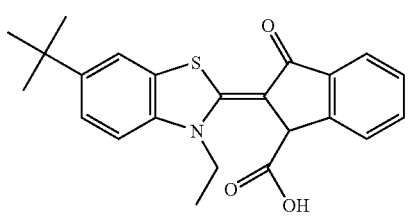
(A-5)
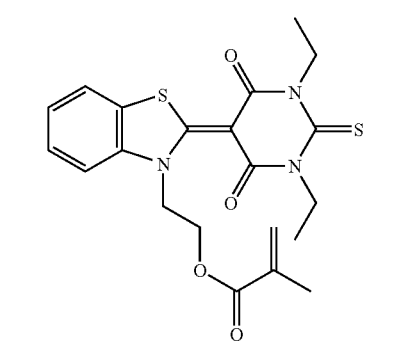
(A-6)
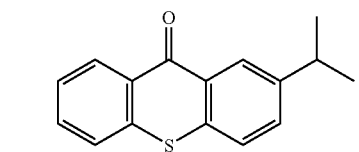
(A-7)
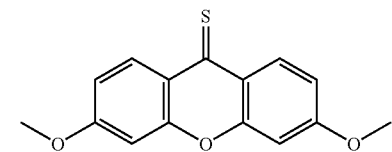
(A-8)
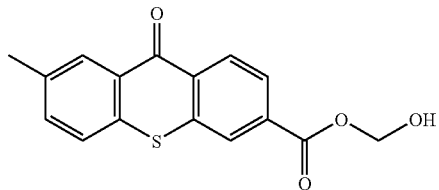
(A-9)
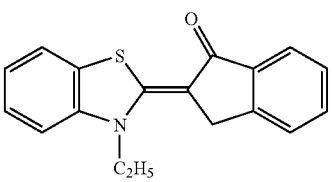
(A-10)
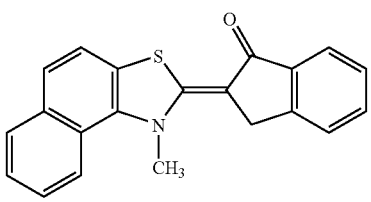
(A-11)
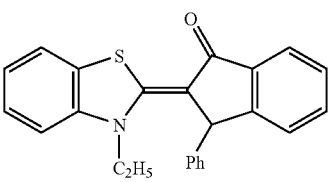
(A-12)
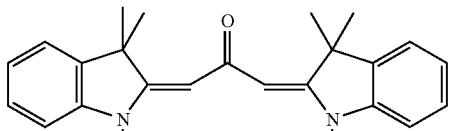
(A-13)
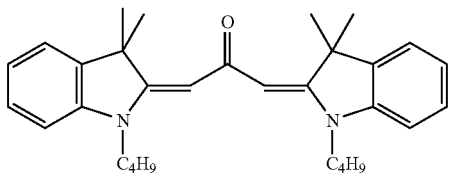
(A-14)
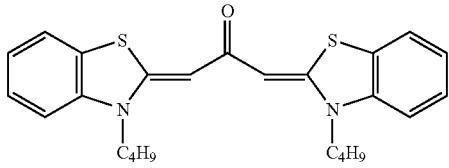
(A-15)
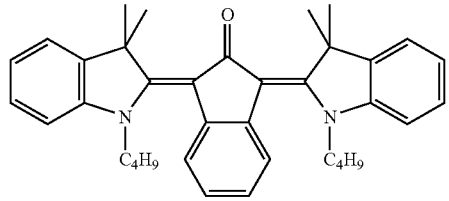

(A-16)
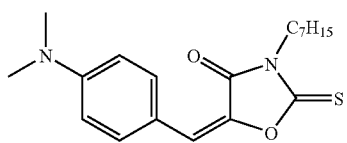

(A-17)
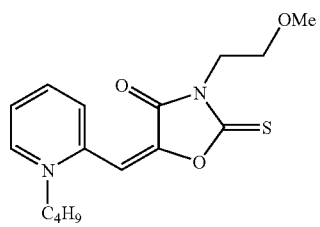

(A-18)
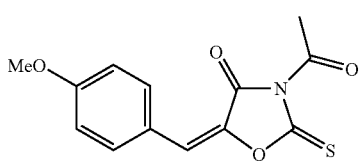

(A-19)
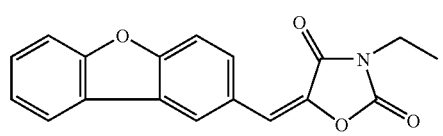

(A-20)
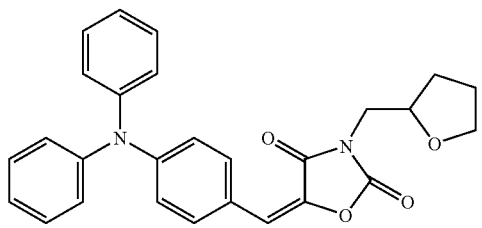

(A-21)
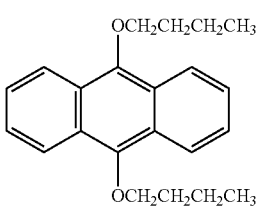

(A-22)
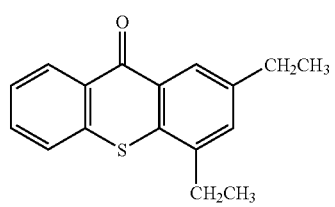

(A-23)
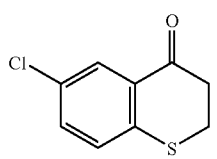

(A-24)
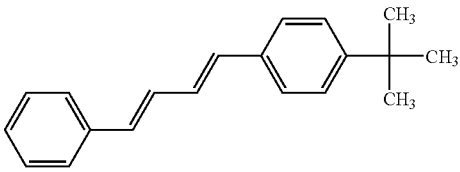

(Co-Sensitizer)

Furthermore, the curable composition of the invention may be added with a known compound having an action of further enhancing the sensitivity or suppressing the polymerization inhibition by oxygen, as a co-sensitizer.

Examples of such a co-sensitizer include amines, for example, the compounds described in M. R. Sander, et al., "Journal of Polymer Society," Vol. 10, p. 3173 (1972), Japanese Patent Application Publication (JP-B) No. 44-20189, JP-A Nos. 51-82102, 52-134692, 59-138205, 60-84305, 62-18537 and 64-33104, and Research Disclosure No. 33825; and the like. More specifically, triethanolamine, p-dimethylaminobenzoic acid ethyl ester, p-formyldimethylaniline, p-methylthiodimethylaniline, and the like may be mentioned.

Other examples of the co-sensitizer include thiols and sulfides, for example, the thiol compounds described in JP-A No. 53-702, JP-B No. 55-500806 and JP-A No. 5-142772; the disulfide compounds described in JP-A No. 56-75643; and the like. More specifically, 2-mercaptobenzothiazole, 2-mercaptobenzoxazole, 2-mercaptobenzimidazole, 2-mercapto-4(3H)-quinazoline, β-mercaptonaphthalene, and the like may be mentioned.

Still other examples of the co-sensitizer include amino acid compounds (for example, N-phenylglycine, and the like); organometallic compounds described in JP-B No. 48-42965 (for example, tributyltin acetate, and the like); hydrogen donors described in JP-B No. 55-34414; sulfur compounds described in JP-A No. 6-308727 (for example, trithiane, and the like); phosphorus compounds described in JP-A No. 6-250387 (diethyl phosphite, and the like); Si—H and Ge—H compounds described in Japanese Patent Application No. 6-191605; and the like.

The curable composition of the invention may contain various additives in combination in accordance with the purposes, in addition to the sensitizing dye and co-sensitizer that are used together with the essential components of the pigment and the specific dispersant, as well as the polymerizable compound and the polymerization initiator as preferable optional components. For example, from the viewpoint of enhancing the weather resistance of obtainable images and preventing discoloration, an ultraviolet absorbent may be used. Furthermore, an antioxidant may be added to enhance the stability of the ink composition.

Additives that may be used in the curable composition of the invention will be presented in the following.

The curable composition of the invention may be added with various organic and metal complex-based discoloration preventing agents; conductive salts intended to control the injection properties, such as potassium thiocyanate, lithium nitrate, ammonium thiocyanate and dimethylamine hydrochloride; and trace amounts of organic solvents for improving the adhesiveness with the medium to be recorded.

The curable composition of the invention may be added with various polymer compounds for the purpose of regulating the film properties. Examples of the polymer compounds that may be used include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl-based resins, acrylic resins, rubber-based resins, waxes, other natural resins, and the like. These may be used in combination of two or more compounds.

The curable composition of the invention may also be added with a nonionic surfactant, a cationic surfactant, an organic fluorocompound or the like, for the regulation of the liquid properties.

In addition to these, for example, a leveling additive, a matting agent, a wax for regulating the film properties, a tackifier for improving the adhesiveness to the medium to be recorded, which does not inhibit polymerization, such as polyolefin or PET, and the like may be incorporated according to necessity.

The curable composition of the invention thus obtained is a colored curable composition in which a pigment as a colorant is uniformly and stably dispersed. In this composition, even a fine-grained pigment is uniformly dispersed without causing aggregation or precipitation over time, and the effects are sustained, so that excellent color-developing properties may be obtained. Therefore, such a colored curable composition may be suitably used for the applications requiring good color-developing properties, the applications requiring photoresistant colorants, and in an extensive variety of fields such as, for example, curable ink compositions, nanoimprint compositions and surface coating agents.

(Curable Ink Composition)

The curable ink composition, which is the optimal application of the curable composition of the invention, will be explained. The curable ink composition of the invention is formed from the curable composition of the invention as described above.

The curable ink composition formed by applying the curable composition cures with high sensitivity under the action of active energy rays, and there is no fear of viscosity increases caused by a decrease in the dispersion stability of the pigment, or of a decrease in colorability. Therefore, as will be described later, the curable ink composition is suitably used in the inks for inkjetting, which are applied to inkjet recording methods where viscosity stability is required.

In the case of using the curable ink composition of the invention in an inkjet recording method, the ink viscosity at the temperature of ejection is preferably 30 mPa·s or less, and more preferably 20 mPa·s or less, in consideration of the ejectability of the ink composition, and it is preferable to determine the ink viscosity by appropriately adjusting the composition ratio so that the ink viscosity would fall in the range mentioned above.

The ink viscosity at 25° C. (room temperature) is 0.5 mPa·s or more and 200 mPa·s or less, preferably 1 mPa·s or more and 100 mPa·s or less, and more preferably 2 mPa·s or more and 50 mPa·s or less. When the viscosity at room temperature is set to be high, even if a porous medium to be recorded is used, ink penetration into the medium to be recorded is prevented, a reduction in the uncured monomers and a reduction of foul odor may be achieved, and dot bleeding at the time of landing of ink droplets may be suppressed. As a result, image quality is improved. If the ink viscosity at 25° C. is greater than 200 mPa·s, there occurs a problem in the delivery of ink liquid.

The surface tension of the curable ink composition of the invention is preferably from 20 to 40 mN/m, and more preferably from 23 to 35 mN/m. When recording is performed on various media to be recorded, such as polyolefin, PET, coated paper and non-coated paper, the surface tension is preferably 20 mN/m or more from the viewpoint of bleeding and penetration, and is preferably 35 mN/m or less from the viewpoint of wettability.

The curable ink composition thus adjusted is suitably used as an ink for inkjet recording. Printing is performed with the ink composition on a medium to be recorded, using an inkjet printer, and then the printed ink composition is irradiated with active energy rays and cured. Thus, recording is carried out.

The printed matter obtained using this ink has the image areas cured by irradiation with active energy rays, and has excellent strength in the image areas. Therefore, the ink may be used in various applications, in addition to the image formation using the ink, such as the formation of an ink receiving layer (image area) in planographic printing plates.

Next, the pigment dispersion of the invention and the curable ink composition containing this dispersion may be suitably used in inks for inkjetting. The inkjet recording method and inkjet recording apparatus that may be employed in this case will be explained below.

(InkJet Recording Method)

The inkjet recording method of the invention is characterized by using the curable ink composition of the invention.

In the inkjet recording method of the invention, it is preferable to heat the ink composition to 40 to 80° C. so as to adjust the viscosity of the ink composition to 30 mPa·s or less, and then to eject the ink composition, and high ejection stability may be realized by using this method.

In general, since active energy ray-curable ink compositions usually have higher viscosities than aqueous inks, the active energy ray-curable ink compositions have greater ranges of fluctuation in viscosity due to temperature fluctuation upon printing. The viscosity fluctuation in this ink composition directly exerts large influence on the liquid droplet size and the rate of liquid droplet ejection, and thereby causes deterioration in the image quality. Therefore, it is necessary to maintain the ink composition temperature at the time of printing as constant as possible. The range of control for the ink composition temperature is preferably adjusted to the set temperature ±5° C., more preferably to the set temperature ±2° C., and particularly preferably to the set temperature ±1° C.

A feature of the inkjet recording apparatus used in the inkjet recording method is that the apparatus is equipped with an ink composition temperature stabilization unit, and the region to be maintained at a constant temperature covers all of the piping system and members including from the ink tank (if an intermediate tank is present, including the intermediate tank) to the nozzle ejection surface.

The method of controlling the temperature is not particularly restricted, but it is preferable, for example, to provide plural temperature sensors at various sites along the piping and to control by heating in accordance with the flow rate of the ink composition and the environment temperature. The head unit to be heated is preferably thermally shielded or insulated so that the main body of the apparatus is not affected by the temperature of air from the outside. In order to shorten the printer warm-up time required for heating, or to reduce a loss of thermal energy, it is preferable to insulate the head unit from other sites, and at the same time, to render the heat capacity of the entire heating unit small.

When a photopolymerization initiator is added to the ink composition of the invention as the polymerization initiator mentioned above, the ink composition becomes an active energy ray-curable ink composition.

The conditions for the irradiation of such an ink composition with active energy rays will be described. Fundamental irradiation methods are disclosed in JP-A No. 60-132767.

Specifically, light sources are provided on both sides of a head unit, and the head and the light sources are scanned in a shuttling manner. The irradiation is performed at a certain time after the ink has landed. Furthermore, curing is completed by a separate light source that does not necessitate driving. WO 99/54415 discloses irradiation methods, such as a method of using an optical fiber, and a method of irradiating recorded areas with UV light by allowing a collimated light source to hit a mirror surface provided on the side face of a head unit. This invention may be achieved using these irradiation methods.

When the ink composition of the invention is used, the ink composition is heated to a certain temperature, and is irradiated with active energy rays after a certain time period of from the landing to the irradiation, the time period being preferably from 0.01 to 0.5 seconds, more preferably 0.01 to 0.3 seconds, and even more preferably from 0.01 to 0.15 seconds. As such, when the time taken from the landing to the irradiation is controlled to be extremely short, the landed ink bleeding before curing may be prevented.

Even in a porous medium to be recorded, the ink composition may be exposed before the ink composition penetrates down to the core where the liquid source does not reach. Therefore, remaining of unreacted monomers is suppressed, and as a result, foul odor may be reduced.

When the inkjet recording method as described above and the curable ink composition of the invention are used in combination, a high synergistic effect is brought in. Particularly, if an ink composition having an ink viscosity at 25° C. of 200 mPa·s or less is used, great effects may be obtained.

When such an inkjet recording method is employed, the dot diameter of the landed ink may be maintained constant even for various media to be recorded having different surface wettability, and thus the image quality is enhanced. Furthermore, in order to obtain color images, it is preferable to superimpose colors in order, starting from a color having low brightness. When inks with high brightness are superimposed, it is difficult for the irradiated radiation to reach the ink at a lower part, and inhibition of the curing sensitivity, an increase in the amount of residual monomer, generation of foul odor, and deterioration of adhesiveness are likely to occur. In regard to the irradiation, although it is possible to eject all colors and expose the inks altogether, it is preferable to expose one color at a time, from the viewpoint of accelerating the curing.

The inkjet recording apparatus used in the invention is not particularly limited, and any commercially available inkjet recording apparatus may be used. That is, according to the invention, recording may be achieved on a medium to be recorded (printed matter) using a commercially available inkjet recording apparatus.

According to the preferable ejection conditions, the ink composition of the invention is repeatedly subjected to temperature rise and fall. However, due to the function of the pigment dispersant, a decrease in the pigment dispersibility is suppressed, and thus excellent color-developing properties over a long time period may be obtained, even if the ink composition is stored under such temperature conditions. Furthermore, there is another advantage that a decrease in the jetting properties caused by aggregation of the pigment is also suppressed.

(Medium to be Recorded)

The medium to be recorded to which the ink composition of the invention is applicable is not particularly limited, and conventional paper such as non-coated paper and coated paper, various non-absorptive resin materials used in so-called soft packaging, or resin films formed by molding the non-absorptive resin materials into a film shape may be used. Examples of the various plastic films include PET films, OPS films, OPP films, ONy films, PVC films, PE films, TAC films and the like. In addition to those, the plastics that may be used as the material for the medium to be recorded include polycarbonate, acrylic resins, ABS, polyacetal, PVA, rubbers and the like. Metals and glasses may also be used as media to be recorded.

(Printed Matter)

When printing is performed by an inkjet printer using the curable ink composition of the invention on a medium to be recorded, and then preferably the printed ink composition is irradiated with active energy rays to cure, a printed matter may be obtained. Since the ink used in image formation includes fine pigment particles in a uniformly and stably dispersed state, the printed matter produced by using the curable ink composition of the invention has high quality images that are excellent in color-developing properties and sharpness and are also excellent in weather resistance. Therefore, the curable ink composition of the invention may be applied to a broad range of applications.

Exemplary embodiments of the invention will be listed below.

<1> A pigment dispersion, comprising:

(a) a pigment; and (b) a polymer having a polyurethane bond in a main chain, having at least one polymer chain selected from the group consisting of a polyester, a polyacrylate, a polymethacrylate and a polyalkylene oxide at a side chain of the polymer, and having a partial skeleton that is different from a partial skeleton included in a chemical structure of the pigment, as a pendant of the main chain.

<2> The pigment dispersion according to <1> above, wherein the structure of the partial skeleton that is different from the partial skeleton included in the chemical structure of the pigment, is a carbocyclic or heterocyclic fused ring composed of two or three rings.

<3> The pigment dispersion according to <1> or <2>, wherein the partial skeleton that is different from the partial skeleton included in the chemical structure of the pigment is selected from the group consisting of naphthalimide structure, benzimidazolone structure, imidazolidinone structure, anthraquinone structure, acridone structure and carbazole structure.

<4> The pigment dispersion according to <1> or <3>, wherein an average particle size of the pigment is from 0.01 to 0.4 µm.

<5> The pigment dispersion according to any one of <1> to <4>, wherein an content of the pigment in the pigment dispersion is from 1 to 40% by weight in terms of solids content.

<6> The pigment dispersion according to any one of <1> to <5>, wherein an weight average molecular weight of the polymer is from 5,000 to 200,000.

<7> An ink composition comprising the pigment dispersion according to any one of <1> to <6> and a liquid medium having an affinity with the polymer of the pigment dispersion.

<8> A curable composition, containing the pigment dispersion according to any one of <1> to <6> above and (c) a polymerizable compound.

<9> A curable ink composition containing the curable composition according to <8> above.

EXAMPLES

Hereinafter, the present invention will be described more specifically by way of Examples, but the invention is not intended to be limited to the embodiments of these Examples.

In addition, the polymer molecular weight of the polymer of component (b) in the Synthesis Examples shown below represents the weight average molecular weight, and it was measured by GPC (trade name: GPC HLC-8220GPC, manufactured by Tosoh Corp.). This GPC measurement was carried out using three columns (trade name: TSKGEL SUPER AWMHH, manufactured by Tosoh Corp.) connected in series, and using N-methylpyrrolidone (NMP) as an eluent liquid, at a flow rate of 0.5 mL/second at 40° C. The molecular weight was calculated based on a comparison with standard polystyrenes.

Synthesis Example 1

<Synthesis of M-1

15 g of 9(10H)acridone (manufactured by Wako Pure Chemical Industries, Ltd.) and 3.4 g of sodium hydroxide (manufactured by Wako Pure Chemical Industries, Ltd.) were dissolved in 84 g of dimethyl sulfoxide (manufactured by Wako Pure Chemical Industries, Ltd.), and the solution was heated to 45° C. 17.6 parts of CMS-P (manufactured by Seimi Chemical Co., Ltd.; chloromethylstyrene) was added dropwise to the solution, and the mixture was subjected to heating and stirring for further 5 hours at 50° C. This reaction liquid was poured under stirring into a mixed solution of 30 g of distilled water and 30 g of methanol (manufactured by Wako Pure Chemical Industries, Ltd.), and the resulting precipitate was separated by filtration and washed with 300 g of a solution prepared by mixing equal amounts by weight of distilled water and methanol. The resulting solids were dried under reduced pressure, and thus 17.5 g of 10-[(styrenyl)methyl]-9-acridanone was obtained as pale yellow solids. 175 g of N-methylpyrrolidone (manufactured by Wako Pure Chemical Industries, Ltd.) was added to 17.5 g of 10-[(styrenyl)methyl]-9-acridanone and 60.9 g of thioglycerol (manufactured by Sigma-Aldrich Co.), and the mixture was heated to 65° C. and stirred for 30 minutes under a nitrogen atmosphere. Subsequently, 0.14 g of V-65 (trade name, manufactured by Wako Pure Chemical Industries, Ltd.; 2,2'-azobis(2,4-dimethylvaleronitrile) was added thereto, and the mixture was stirred for 2 hours. 500 g of a mixed solvent of water/methanol (mixture at a weight ratio of 1:1) was added to the reaction solution, and the crystals crystallized out therefrom were separated by filtration and were washed using 100 g of methanol. The obtained solids were dried under reduced pressure, and 22.0 g of M-1 was obtained as pale yellow solids.

Synthesis Example 2

<Synthesis of M-6>

175 g of N-methylpyrrolidone was added to 10.9 g of N-vinylcarbazole (manufactured by Tokyo Chemical Industry Co., Ltd.) and 60.9 g of thioglycerol, and the mixture was heated to 65° C. and stirred for 30 minutes under a nitrogen atmosphere. Subsequently, 0.14 g of V-65 (trade name) was added thereto, and the mixture was stirred for 2 hours. 550 g of a mixed solvent of water/methanol (mixture at a weight ratio of 1:1) was added to the reaction solution, and the crystals crystallized out therefrom were separated by filtration and were washed using 100 g of methanol. The obtained solids were dried under reduced pressure, and 14.0 g of M-6 was obtained as white solids.

Synthesis Example 3

<Synthesis of M-8>

22.3 g of 2-aminoanthraquinone (manufactured by Wako Pure Chemical Industries, Ltd.) and 180 g of dimethyl sulfoxide were stirred at 60° C., and then 0.04 g of STANOCT (trade name, manufactured by API Corporation; stannous octoate) was added thereto. Furthermore, 20.2 g of KARENZ MOI (trade name, manufactured by Showa Denko Kabushiki Kaisha; 2-isocyanatoethyl methacrylate) was added thereto, and the mixture was stirred for 4 hours. The reaction solution was filtered, and the filtrated was cooled to room temperature. Subsequently, 200 g of normal hexane was added to the reaction solution, and the mixture was stirred for one hour and then was subjected to filtration and washing, to obtain 33.1 g of 2-(2-methacryloyloxyethylureido)anthraquinone. 175 g of N-methylpyrrolidone (manufactured by Wako Pure Chemical Industries, Ltd.) was added to 21.1 g of 2-(2-methacryloyloxyethylureido)anthraquinone and 60.9 g of thioglycerol (manufactured by Sigma-Aldrich Co.), and the mixture was heated to 65° C. and stirred for 30 minutes under a nitrogen atmosphere. Subsequently, 0.14 g of V-65 (trade name, manufactured by Wako Pure Chemical Industries, Ltd.; 2,2'-azobis (2,4-dimethylvaleronitrile) was added thereto, and the mixture was stirred for 2 hours. 500 g of a mixed solvent of water/methanol (mixture at a weight ratio of 1:1) was added to the reaction solution, and the crystals crystallized out therefrom were separated by filtration and were washed using 100 g of methanol. The obtained solids were dried under reduced pressure, and 23.0 g of M-8 was obtained as brown solids.

Synthesis Example 4

<Synthesis of M-9>

200 g of N-methylpyrrolidone (manufactured by Wako Pure Chemical Industries, Ltd.) was added to 26.0 g of SIPOMER WAM II [trade name, manufactured by Rhodia Group; 50% aqueous solution of 2-(2-oxo-1-imidazolidinyl) ethyl methacrylate] and 60.9 g of thioglycerol (manufactured by Sigma-Aldrich Co.), and the mixture was heated to 65° C. and stirred for 30 minutes under a nitrogen atmosphere. Subsequently, 0.14 g of V-65 (manufactured by Wako Pure Chemical Industries, Ltd.; 2,2'-azobis(2,4-dimethylvaleronitrile) was added thereto, and the mixture was stirred for 2 hours. The reaction solution was purified by column chromatography, and thus 9.0 g of M-9 was obtained.

Synthesis Example 5

<Synthesis of B-1>

120 g of DBE (manufactured by Invista Japan Kabushiki Kaisha), 100 g of methyl methacrylate (manufactured by Wako Pure Chemical Industries, Ltd.) and 2.2 g of thioglycerol were introduced into a nitrogen-purged three-necked flask, and the mixture was stirred with a stirrer (manufactured by Shinto Scientific Co., Ltd.; three-one motor). The mixture was heated while nitrogen was blown into the flask, to raise the temperature to 105° C. 0.262 g of VA-086 (trade name, manufactured by Wako Pure Chemical Industries, Ltd.; 2,2'-azobis[2-methyl-N-(2-hydroxyethyl)propionamide]) was added thereto, and then the mixture was stirred for two hours. 0.131 g of VA-086 was further added, and the mixture was subjected to heating and stirring for 4 hours at 115° C. The reaction solution was left to cool at room temperature, and then 100 g of DBE was added thereto. The mixture was poured into 6000 g of n-hexane. The solids precipitated therefrom were separated by filtration and were dried under reduced pressure, and thus 99.1 g of poly(methyl methacrylate) having diols at the ends (B-1) was obtained (weight average molecular weight 6,000).

Synthesis Example 6

<Synthesis of B-5>

22.8 g of 2-ethylhexanol and 0.1 g of monobutyltin oxide were added to 200 g of ε-caprolactone, and the mixture was stirred for 5 hours under a nitrogen atmosphere. Subsequently, the mixture was heated to 110° C., and was stirred for one hour. The mixture was returned to room temperature, subsequently 800 g of acetone was added thereto, and the mixture was allowed to reprecipitate in 10 kg of a mixed solvent of water/methanol (mixture at a weight ratio of 1:1). The resulting polymer was separated by filtration, and thus 150 g of B-5 was obtained.

<B-6>

Polyethylene glycol monostearate (25EO) (manufactured by Wako Pure Chemical Industries, Ltd.) was used as a compound B-6.

Synthesis Example 7

<Synthesis of DVE-3 Solution of Polymer P-1>

195 g of DVE-3 (triethylene glycol divinyl ether, manufactured by BASF Japan, Ltd.), 9.0 g of M-1 produced in Synthesis Example 1, 64.3 g of B-1 produced in Synthesis Example 5, 18.0 g of TDI (tolylene diisocyanate, manufactured by Tokyo Chemical Industry Co., Ltd.), 3.1 g of PDM (2,6-pyridinedimethanol, manufactured by Sigma-Aldrich Co.), and 5.7 g of DEG (diethylene glycol, manufactured by Wako Pure Chemical Industries, Ltd.) were mixed, and the mixture was stirred at 60° C. Furthermore, 0.04 g of STANOCT (trade name, manufactured by API Corp.; stannous octoate) dissolved in 5 g of DVE-3 was added to the mixture, and the resulting mixture was stirred for 4 hours. Thus, a solution of P-1 (weight average molecular weight 120,000) in DVE-3 was obtained.

Synthesis Example 8

<Synthesis of DVE-3 Solution in Polymer P-3>

195 g of DVE-3, 7.7 g of M-1 produced in Synthesis Example 1, 44.2 g of B-5 produced in Synthesis Example 6, 38.5 g of MYTEC GP770A (trade name, manufactured by Mitsubishi Chemical Corp.; trifunctional isocyanate), 7.2 g of PDM, and 2.3 g of DEG were mixed, the solvent (butyl acetate) in MYTEC GP770A was distilled off under reduced pressure, and then the residue was heated to 60° C. Subsequently, 0.04 g of STANOCT dissolved in 5 g of DVE-3 was added thereto, and the mixture was stirred for 4 hours. Thus, a solution of P-3 (weight average molecular weight 45,000) in DVE-3 was obtained.

Synthesis Example 9

<Synthesis of DVE-3 Solution of Polymer P-5>

195 g of DVE-3, 7.1 g of M-6 produced in Synthesis Example 2, 24.5 g of B-6, 49.3 g of MYTEC GP770A, 11.5 g of HMBA (4-hydroxymethylbenzoic acid, manufactured by Sigma-Aldrich Co.), and 7.5 g of DEG were mixed. The solvent in MYTEC GP770A was distilled off under reduced pressure, and then the residue was heated to 60° C. Subsequently, 0.04 g of STANOCT dissolved in 5 g of DVE-3 was added thereto, and the mixture was stirred for 4 hours. Thus, a solution of P-5 (weight average molecular weight 60,000) in DVE-3 was obtained.

Synthesis Example 10

<Synthesis of DVE-3 Solution of Polymer P-7>

195 g of DVE-3, 4.6 g of M-8 produced in Synthesis Example 3, 84.4 g of B-1 produced in Synthesis Example 5, 7.9 g of TDI, 2.6 g of PDM, and 0.5 g of DEG were mixed. After the temperature of the mixture was raised to 60° C., 0.04 g of STANOCT dissolved in 5 g of DVE-3 was added thereto, and the mixture was stirred for 4 hours. Thus, a solution of P-7 (weight average molecular weight 51,000) in DVE-3 was obtained.

Synthesis Example 11

<Synthesis of DVE-3 Solution of Polymer P-8>

97.5 g of DVE-3, 4.9 g of M-9 produced in Synthesis Example 4, 31.9 g of B-1 produced in Synthesis Example 5, 9.0 g of TDI, 3.7 g of PDM, and 0.6 g of DEG were mixed. After the temperature of the mixture was raised to 60° C., 0.02 g of STANOCT dissolved in 2.5 g of DVE-3 was added thereto, and the mixture was stirred for 4 hours. Thus, a solution of P-8 (weight average molecular weight 30,000) in DVE-3 was obtained.

Synthesis Example 12

<Synthesis of DVE-3 Solution of Polymer P-9 for Comparative Example>

195 g of DVE-3, 24.9 g of B-6, 55.5 g of MYTEC GP770A, 12.6 g of HMBA, and 7.0 g of DEG were mixed. The solvent in MYTEC GP770A was distilled off, and then the residue was heated to 60° C. Subsequently, 0.04 g of STANOCT dissolved in 5 g of DVE-3 was added thereto, and the mixture was stirred for 4 hours. Thus, a solution of P-9 (weight average molecular weight 42,000), which is a polymer lacking the different partial skeleton, in DVE-3 was obtained.

Example 1

<Preparation of Pigment Dispersion 1>

A mixture of 30 g of NOVOPERM YELLOW H2G (yellow, PY120, benzimidazolone azo pigment) as the pigment of component (a), 20 g of the DVE-3 solution of P-1 produced in Synthesis Example 7 as the polymer of component (b), and 50 g of DVE-3, was introduced into a motor mill (trade name: M50, manufactured by Eiger Engineering, Ltd.), and dispersion was performed for 2 hours at a peripheral speed of 9 m/s using zirconia beads having a diameter of 0.65 mm. Thus, a pigment dispersion 1 was obtained.

Examples 2 and 3

<Preparation of Pigment Dispersions 2 and 3>

Pigment dispersions 2 and 3 were prepared by the same preparation method as that used for the pigment dispersion of Example 1, except that the DVE-3 solution of P-3 produced in Synthesis Example 8 and the DVE-3 solution of P-7 produced in Synthesis Example 10 were respectively used instead of the DVE-3 solution of P-1, as the polymer of component (b).

Example 4

<Preparation of Pigment Dispersion 4>

A mixture of 30 g of CINQUASIA MAGENTA RT-355-D (trade name; magenta color, PR42 (mixed crystals of quinacridone and 2,9-dichloroquinacridone)) manufactured by Ciba Specialty Chemicals, Inc. as the pigment of component (a), 20 g of the DVE-3 solution of P-7 produced in Synthesis 10 as the polymer of component (b), and 65 g of DVE-3, was introduced into a motor mill (trade name: M50, manufactured by Eiger Engineering, Ltd.), and dispersion was performed for 2 hours at a peripheral speed of 9 m/s using zirconia beads having a diameter of 0.65 mm. Thus, a pigment dispersion 4 was obtained.

Examples 5 and 6

>Preparation of Pigment Dispersions 5 and 6>

A pigment dispersion 5 and a pigment dispersion 6 were prepared by the same preparation method as that used for the pigment dispersion 4, except that the DVE-3 solution of P-5 produced in Synthesis Example 9 and the DVE-3 solution of P-8 produced in Synthesis Example 11 were respectively used instead of the DVE-3 solution of P-7, as the polymer of component (b).

Comparative Example 1

<Preparation of Pigment Dispersion C1>

A pigment dispersion C1 was produced in the same manner as in the preparation of the pigment dispersion 1, except that the DVE-3 solution of polymer P-9 for comparison produced in Synthesis Example 12 was used instead of the DVE-3 solution of P-1 used as the polymer of component (b) in Example 1.

Comparative Example 2

<Preparation of Pigment Dispersion C2>

A pigment dispersion C2 was produced in the same manner as in the preparation of the pigment dispersion 4, except that the DVE-3 solution of polymer P-9 for comparison produced in Synthesis Example 12 was used instead of the DVE-3 solution of P-7 used as the polymer of component (b) in Example 4.

Comparative Example 3

<Preparation of pigment dispersion C3>

A pigment dispersion C3 was produced in the same manner as in the preparation of the pigment dispersion 4, except that the DVE-3 solution of polymer P-1 produced in Synthesis Example 7, which has the same partial skeleton (acridone skeleton) as that of the pigment, was used instead of the DVE-3 solution of P-7 used as the polymer of component (b) in Example 4.

Example 7

<Preparation of Curable Ink Composition 1>

10 g of the pigment dispersion 1 prepared in Example 1, 31.5 g of 1,6-hexanediol diacrylate (trade name: SR238, manufactured by Sartomer Co., Inc.) as the (c) polymerizable compound, 40 g of dipropylene glycol diacrylate (trade name: SR508, manufactured by Sartomer Co., Inc.), 5.0 g of polyester acrylate (trade name: EBECRY1657, manufactured by Daicel Cytec Co., Ltd.), 2.5 g of 1-hydroxycyclohexyl phenyl ketone (trade name: IRGACURE 184, manufactured by Ciba Specialty Chemicals Corp.) as the (d) polymerization initiator, 7.0 g of 2,4,6-trimethylbenzoyldiphenylphosphine oxide (trade name: LUCIRIN TPO, manufactured by BASF Japan, Ltd.), 3.9 g of benzophenone (manufactured by Wako Pure Chemical Industries, Ltd.), and 0.10 g of surfactant BYK307 (trade name, manufactured by BYK Chemie) were mixed with the pigment dispersion, and then the resultant was filtered under pressure through a membrane filter. Thus, a curable ink composition 1 for curable inkjet recording was obtained.

Examples 8 and 9

<Preparation of Curable Ink Compositions 2 and 3>

Curable ink compositions 2 and 3 for inkjet recording were produced by the same production method as that used for the curable ink composition 1 of Example 7, except that the pigment dispersions 2 and 3 were respectively used instead of the pigment dispersion 1.

Example 10

<Preparation of Curable Ink Composition 4>

15 g of the pigment dispersion 4 produced in Example 4, 26.5 g of 1,6-hexanediol diacrylate (trade name: SR238, manufactured by Sartomer Co., Inc.) as the (c) polymerizable compound, 40 g of dipropylene glycol diacrylate (trade name: SR508, manufactured by Sartomer Co., Inc.), 5 g of polyester acrylate (trade name: EBECRY1657, manufactured by Daicel Cytec Co., Ltd.), 2.5 g of 1-hydroxycyclohexyl phenyl ketone (trade name: IRGACURE 184, manufactured by Ciba Specialty Chemicals Corp.) as the (d) polymerization initiator, 7 g of 2,4,6-trimethylbenzoyldiphenylphosphine oxide (trade name: LUCIRIN TPO, manufactured by BASF Japan, Ltd.), 3.9 g of benzophenone (manufactured by Wako Pure Chemical Industries, Ltd.), and 0.1 g of surfactant BYK307 (trade name, manufactured by BYK Chemie) were mixed with the pigment dispersion, and then the resultant was filtered under pressure through a membrane filter. Thus, a curable ink composition 4 for curable inkjet recording was obtained.

Examples 11 and 12

<Preparation of Curable Ink Compositions 5 and 6>

Curable ink compositions 5 and 6 for inkjet recording were produced by the same production method as that used for the curable ink composition 4 of Example 10, except that the pigment dispersions 5 and 6 were respectively used instead of the pigment dispersion 4.

Comparative Example 4

<Preparation of Curable Ink Composition C1>

A curable ink composition C1 was produced in the same manner as in the preparation of the curable ink composition 1, except that the pigment dispersion C1 was used instead of the pigment dispersion 1 used in Example 7.

Comparative Example 5

<Preparation of Curable Ink Composition C2>

A curable ink composition C2 was produced in the same manner as in the preparation of the curable ink composition 4, except that the pigment dispersion C2 was used instead of the pigment dispersion 4 used in Example 10.

Comparative Example 6

<Preparation of Curable Ink Composition C3>

A curable ink composition C3 was produced in the same manner as in the preparation of the curable ink composition 4, except that the pigment dispersion C3 was used instead of the pigment dispersion 4 used in Example 10.

<Evaluation of Pigment Dispersion>

For each of the pigment dispersions, the particle size of the pigment in the composition and the viscosity of the composition were measured by the methods described below, and the pigment dispersions were classified into the grades A to C under the criteria described below. In all cases, grade A represents the best evaluation result. The results are presented in Table 2.

—Particle Size—

The particle size of each of the pigment dispersions was measured using a light scattering/diffraction type particle size distribution analyzer (trade name: LB500, manufactured by Horiba, Ltd.), and the pigment dispersions were rated under the following criteria.

[When pigment is NOVOPERM YELLOW H2G (pigment dispersions 1, 2, 3 and C1)]

A: The median diameter is 100 nm or larger and smaller than 150 nm

B: The median diameter is 150 nm or larger and smaller than 200 nm

C: The median diameter is 200 nm or larger

[When pigment is CINQUASIA MAGENTA RT-355D (pigment dispersions 4, 5, C2 and C3)]

A: The median diameter is 80 nm or larger and smaller than 120 nm

B: The median diameter is 120 nm or larger and smaller than 170 nm

C: The median diameter is 170 nm or larger

—Viscosity—

The viscosity at 25° C. of each of the pigment dispersions was measured using an E type viscometer, and the pigment dispersions were rated under the following criteria.

A: Less than 500 mPa·s

B: 500 mPa·s or more and less than 1200 mPa·s

C: 1200 mPa·s or more (the level at which circulation of the pigment dispersion stops during dispersing)

<Evaluation of Curable Ink Composition>

For each of the curable ink compositions, the particle size of the pigment in the composition and the viscosity of the composition were measured by the methods as described below, and the curable ink compositions were classified into the grades from A to C under the criteria described below.

The dispersion stability of the pigment in the curable ink composition was evaluated by the method as described below, and the curable ink compositions were classified into the grades from A to D.

Furthermore, the performance of each of the curable ink compositions in the case of using the curable ink composition as an ink for inkjet printer, was evaluated by the method described below, and the compositions were classified into the grades from A to C. In all cases, grade A represents the best evaluation result. The results are presented in Table 2.

—Particle Size —

The particle size of each of the curable ink compositions was measured using a light scattering/diffraction type particle size distribution analyzer (trade name: LB500, manufactured by Horiba, Ltd.), and the curable ink compositions were rated under the following criteria.

[When pigment is NOVOPERM YELLOW H2G (curable ink compositions 1, 2, 3 and C1)]

A: The median diameter is 100 nm or larger and smaller than 150 nm

B: The median diameter is 150 nm or larger and smaller than 200 nm

C: The median diameter is 200 nm or larger

[When pigment is CINQUASIA MAGENTA RT-355D (curable ink compositions 4, 5, C2 and C3)]

A: The median diameter is 80 nm or larger and smaller than 120 nm

B: The median diameter is 120 nm or larger and smaller than 170 nm

C: The median diameter is 170 nm or larger

—Viscosity—

The viscosity at 25° C. of each of the curable ink compositions was measured using an E type viscometer, and the pigment dispersions were rated under the following criteria.

A: Less than 30 mPa·s

B: 30 mPa·s or more and less than 50 mPa·s (the level at which nozzle clogging starts to occur upon jetting)

C: 50 mPa·s or more (the level at which nozzle clogging occurs seriously and there is a problem)

—Dispersion Stability—

Each of the curable ink compositions was stored for 4 weeks at 25° C. and then was stored for one week at 60° C. Subsequently, the dispersed state of the pigment in each of the compositions was evaluated by visual inspection, and at the same time, the viscosity of each of the compositions was measured, to thereby measure the proportion of changes in the viscosity before and after storage. The curable ink compositions were rated under the following criteria.

A: Level at which there is no generation of precipitates, and the dispersion stability is high, with the increase in the viscosity being less than 5%

B: Level at which there is no generation of precipitates, and there is no problem in jettability, with the increase in the viscosity being 5% or more and less than 10%.

C: Level at which there is no generation of precipitates, but practically there is a problem, with the increase in the viscosity being 10% or more and jettability being lowered.

D: Level at which generation of precipitates or liquid separation is recognized, and thus the ink composition is unusable.

—Nozzle Defect (Clogging)—

In order to evaluate the performance in the case of using each of the curable ink compositions as an ink for inkjet recording, each of the compositions was repeatedly subjected to a heating and cooling cycle between 25° C. and 60° C. for 10 times, and then was filled into the ink cartridge of an inkjet recording experimental apparatus having piezoelectric type inkjet nozzles (printing density 300 dpi, droplet striking frequency 4 kHz, and number of nozzles 64). Solid image printing was performed on three sheets of ordinary A4-size paper, and the presence or absence of nozzle defect was observed. Thus, the ink compositions were rated under the following criteria.

A: Nozzle defect did not occur, and high quality images were formed.

B: Satellites occurred in some parts, and image defects were observed.

C: Nozzle defect occurred, and image defects were significant.

—Curability and Blocking Resistance—

A sample provided by printing a solid image on a vinyl chloride sheet with an inkjet recording experimental apparatus, was exposed using a Deep UV lamp (trade name: SP-7, manufactured by Ushio, Inc.) under the conditions of supplying 300 mJ/cm$^2$ of energy, and thus a printed sample was obtained. All of the inks mentioned in the Examples and Comparative Examples cured satisfactorily, and when the cured films were touched with a finger, stickiness was not observed.

Furthermore, three sheets of the printed samples were superimposed, and a weight was placed to provide a load of 1 (g/cm$^3$). After 6 hours, a blocking resistance test for evaluating to what extent the printed surface adheres to a sheet superimposed thereon, was also performed. However, adhesion was not seen in any of the printed samples.

Furthermore, the curable ink compositions cured rapidly when irradiated with active energy rays, and high quality images could be formed. Therefore, it could be confirmed that even if printed paper sheets were superimposed, they did not stick to each other, that is, printed matters having excellent blocking resistance could be obtained.

On the contrary, the pigment dispersion C1 of Comparative Example 1 and the pigment dispersion C2 of Comparative Example 2, which made use of the polymer P-8 that did not have a skeleton similar to the pigment, could not yield low viscosity pigment dispersions. The curable ink compositions of Comparative Examples 4 and 5 prepared using those pigment dispersions were poor particularly in storage properties (stability (60° C.)) under high temperature conditions, and the compositions were at a level of causing problems in practice. Furthermore, as shown in Comparative Example 3 of the

TABLE 2

| | Polyurethane polymer | Pigment | Pigment dispersion | Evaluation of pigment dispersion | |
|---|---|---|---|---|---|
| | | | | Particle size | Viscosity |
| Example 1 | P-1 | PY120 | 1 | A | A |
| Example 2 | P-3 | PY120 | 2 | A | A |
| Example 3 | P-7 | PY120 | 3 | A | A |
| Example 4 | P-7 | PR42 | 4 | A | A |
| Example 5 | P-5 | PR42 | 5 | A | B |
| Example 6 | P-8 | PR42 | 6 | B | B |
| Comparative Example 1 | P-9 | PY120 | C1 | C | C |
| Comparative Example 2 | P-9 | PR42 | C2 | A | C |
| Comparative Example 3 | P-1 | PR42 | C3 | B | C |

TABLE 3

| | Curable ink composition | Pigment | Pigment dispersion | Evaluation of curable ink composition | | | | |
|---|---|---|---|---|---|---|---|---|
| | | | | Particle size | Viscosity | Dispersion stability of pigment | | Nozzle defect |
| | | | | | | 25° C. | 60° C. | |
| Example 7 | 1 | PY120 | 1 | A | A | A | A | A |
| Example 8 | 2 | PY120 | 2 | A | A | A | B | B |
| Example 9 | 3 | PY120 | 3 | A | A | A | A | A |
| Example 10 | 4 | PR42 | 4 | A | A | A | A | A |
| Example 11 | 5 | PR42 | 5 | A | A | A | A | A |
| Example 12 | 6 | PR42 | 6 | B | B | A | B | B |
| Comparative Example 4 | C1 | PY120 | C1 | C | B | C | D | C |
| Comparative Example 5 | C2 | PR42 | C2 | B | A | B | C | B |
| Comparative Example 6 | C3 | PR42 | C3 | B | A | A | A | C |

As can be seen from the results presented in Table 2, the pigment dispersions of the invention have micronized pigments and low viscosity, and thus the state is dispersion is satisfactory. Particularly, when PR42 was used, even when a pigment dispersion was prepared to result in a pigment dispersion liquid having a concentration as high as 30%, fluidity was maintained and fine dispersing could be achieved due to the effects of the polymer of component (b). Furthermore, the dispersed state was maintained even after the dispersion was stored for a long time. Thus, it was understood that the stability of the dispersion was excellent.

As can be seen from the results presented in Table 3, the curable ink compositions according to the invention could be jetted out satisfactorily with an inkjet printer, and even after being stored for a long time, the dispersibility of the pigment and the dispersion stability were all satisfactory, while increases in the viscosity that are concomitant with a decrease in the dispersibility of pigment did not occur.

Table 2, when acridone, which is a partial skeleton of a quinacridone pigment, was introduced to the polymer, the viscosity of the high concentration pigment dispersions increased, and micronization of the pigment was not achieved.

The pigment dispersion according to the invention is excellent in dispersibility even when the dispersion contains a fine-grained pigment at a high concentration, and the dispersed state is maintained over a long time period so that excellent stability is obtained. An ink composition containing this pigment dispersion forms sharp images with excellent color-developing properties when used in ordinary printing, so that high-definition printed matters may be obtained. In addition, the ink composition may also be suitably used in the production of resists, color filters and optical disks, and is therefore useful as a material for optical modeling.

When the ink composition is used in a curable ink composition used in an inkjet recording method, high quality images may be directly formed based on digital data on a non-absorptive medium to be recorded. Thus, the ink composition of the invention is suitably used in the production of large-area printed matters as well.

According to the invention, there may be provided a pigment dispersion that is excellent in the dispersibility of a fine-grained pigment and the stability of the dispersed state. According to the invention, there may be provided an ink composition that is capable of forming high quality images having vivid color tones and high coloring power, and is excellent in the dispersibility of a fine-grained pigment contained therein and the stability of the dispersed state.

According to the invention, there may be provided a curable composition that contains the pigment dispersion described above, and may be rapidly cured by irradiation with active energy rays.

Furthermore, according to the invention, there may be provided an ink composition suitable for inkjet recording, which contains the pigment dispersion described above, and may be rapidly cured by irradiation with active energy rays.

What is claimed is:

1. A pigment dispersion, comprising:
   (a) a pigment; and
   (b) a polymer having a polyurethane backbone, the polymer comprising:
   at least one polymer side chain selected from the group consisting of a polyester, a polyacrylate, a polymethacrylate and a polyalkylene oxide; and
   a pendant, of a polyurethane part of a main chain of the polymer, comprising a partial skeleton, the partial skeleton being different from a partial skeleton included in a chemical structure of the pigment; wherein the pigment is selected from the group consisting of azo pigment, diketopyrrolopyrrole pigment, dioxazine violet pigment, phthalocyanine pigment, and carbon black pigment; and
   when the pigment is an azo pigment, the partial skeleton of the pendant is selected from the group consisting of an acridone structure, a naphthalimide structure and an anthraquinone structure,
   when the pigment is a diketopyrrolopyrrole pigment, the partial skeleton of the pendant is a naphthalimide structure or an acridone structure,
   when the pigment is a dioxazine violet pigment, the partial skeleton of the pendant is a naphthalimide structure,
   when the pigment is a phthalocyanine pigment, the partial skeleton of the pendant is a naphthalimide structure or an acridone structure, and
   when the pigment is a carbon black pigment, the partial skeleton of the pendant is an acridone structure.

2. The pigment dispersion of claim 1, wherein an average particle size of the pigment is from 0.01 to 0.4 µm.

3. The pigment dispersion of claim 1, wherein a content of the pigment in the pigment dispersion is from 1 to 40% by weight in terms of solid content.

4. The pigment dispersion of claim 1, wherein a weight average molecular weight of the polymer is from 5,000 to 200,000.

5. An ink composition comprising the pigment dispersion of claim 1 and a liquid medium having affinity with the polymer of the pigment dispersion.

6. A curable composition comprising the pigment dispersion of claim 1 and (c) a polymerizable compound.

7. A curable ink composition comprising the curable composition of claim 6.

8. The pigment dispersion of claim 1, wherein the polymer is obtained by a reaction of compounds including a first compound having one or two hydroxyl groups or one or two isocyanate groups together with the partial skeleton which is different from the partial skeleton included in the chemical structure of the pigment, a second compound which is selected from a polyester, a polyacrylate, a polymethacrylate and a polyalkylene oxide, all of which having one or two hydroxyl groups, and a third compound having at least two isocyanate groups, which is different from the first compound, and the reaction is conducted in the presence of a polymerizable compound.

9. The curable ink composition of claim 7, wherein the curable ink composition is solventless.

10. A pigment dispersion, comprising:
    (a) a pigment; and
    (b) a polymer having a polyurethane backbone, the polymer comprising:
    at least one polymer side chain selected from the group consisting of a polyester, a polyacrylate, a polymethacrylate and a polyalkylene oxide; and
    a pendant, of a polyurethane part of a main chain of the polymer, comprising a partial skeleton, the partial skeleton being different from a partial skeleton included in a chemical structure of the pigment; wherein the pigment is selected from the group consisting of diketopyrrolopyrrole pigment, dioxazine violet pigment, phthalocyanine pigment, and carbon black pigment; and
    when the pigment is a diketopyrrolopyrrole pigment, the partial skeleton of the pendant is a naphthalimide structure or an acridone structure,
    when the pigment is a dioxazine violet pigment, the partial skeleton of the pendant is a naphthalimide structure,
    when the pigment is a phthalocyanine pigment, the partial skeleton of the pendant is a naphthalimide structure or an acridone structure, and
    when the pigment is a carbon black pigment, the partial skeleton of the pendant is an acridone structure.

11. The pigment dispersion of claim 10, wherein (b) the polymer having a polyurethane backbone has at least one polymer chain selected from a polyacrylate or a polymethacrylate at a side chain of the polymer.

* * * * *